US012776422B2

(12) United States Patent
Reed

(10) Patent No.: US 12,776,422 B2
(45) Date of Patent: Oct. 27, 2026

(54) NUCLEAR REACTOR FUEL AND ASSOCIATED SYSTEMS AND METHODS

(71) Applicant: The Leapfrog Nuclear Company, Des Moines, WA (US)

(72) Inventor: Mark Wilbert Reed, Tacoma, WA (US)

(73) Assignee: The Leapfrog Nuclear Company, Des Moines, WA (US)

( * ) Notice: Subject to any disclaimer, the term of this patent is extended or adjusted under 35 U.S.C. 154(b) by 0 days.

(21) Appl. No.: 19/433,247

(22) Filed: Dec. 26, 2025

(65) Prior Publication Data

US 2026/0120897 A1 Apr. 30, 2026

Related U.S. Application Data

(63) Continuation of application No. PCT/US2024/033643, filed on Jun. 12, 2024.

(60) Provisional application No. 63/510,362, filed on Jun. 26, 2023.

(51) Int. Cl.
*G21C 3/52* (2006.01)
*G21C 3/54* (2006.01)
*G21C 3/62* (2006.01)

(52) U.S. Cl.
CPC ................. *G21C 3/52* (2013.01); *G21C 3/54* (2013.01); *G21C 3/626* (2013.01)

(58) Field of Classification Search
CPC ... G21C 1/22; G21C 3/44; G21C 3/48; G21C 3/50; G21C 3/52; G21C 3/54; G21C 3/626
See application file for complete search history.

(56) References Cited

U.S. PATENT DOCUMENTS

| | | | |
|---|---|---|---|
| 3,271,133 A | 9/1966 | Knighton et al. | |
| 5,768,329 A | 6/1998 | Berwald | |
| 2008/0296151 A1 | 12/2008 | Lee et al. | |
| 2011/0293061 A1* | 12/2011 | Hyde ........................ | G21C 5/18 264/0.5 |

(Continued)

FOREIGN PATENT DOCUMENTS

| | | | |
|---|---|---|---|
| RU | 2253912 C1 | 6/2005 | |
| WO | 2022237488 A1 | 11/2022 | |

OTHER PUBLICATIONS

International Preliminary Report on Patentability received for PCT Patent Application No. PCT/US2024/033643, mailed on Nov. 13, 2025, 14 pages.

(Continued)

*Primary Examiner* — Sharon M Davis
(74) *Attorney, Agent, or Firm* — Smith, Gambrell & Russell LLP

(57) ABSTRACT

Disclosed are embodiments of a nuclear fuel element for use in various types of nuclear reactors. One embodiment of the nuclear fuel element comprises a plurality of solid nuclear fuel particles, such as tristructural-isotropic (TRISO) fuel particles, intermixed in a non-solid matrix that is substantially stagnant relative to the plurality of solid nuclear fuel particles. The non-solid matrix may comprise a liquid metal, a liquid metal alloy, and a liquid salt. Various embodiments of the non-solid matrix include tin, lead, sodium, aluminum, bismuth, and alloys thereof. A method of manufacturing a nuclear fuel and embodiments of a nuclear fuel core comprising the nuclear fuel element are also disclosed.

25 Claims, 20 Drawing Sheets

(56) References Cited

U.S. PATENT DOCUMENTS

2023/0282376 A1* 9/2023 Wielenga .............. G21C 15/12
376/219
2025/0014768 A1 1/2025 Greenquist

OTHER PUBLICATIONS

International Search Report and Written Opinion dated Aug. 20, 2024 for International Application No. PCT/US2024/033643; 15 pages.

* cited by examiner

NUCLEAR REACTOR FUEL AND ASSOCIATED SYSTEMS AND METHODS

CROSS-REFERENCE TO RELATED APPLICATIONS

This application is a continuation application of International Patent Application Number PCT/US2024/033643, filed Jun. 12, 2024, which claims the benefit of and priority to U.S. Provisional Application No. 63/510,362, filed Jun. 26, 2023, each of which are hereby incorporated by reference in its entirety for any and all purposes.

FIELD OF THE INVENTION

Embodiments of the invention are in the field of nuclear technology. More specifically, particular embodiments of the invention relate to nuclear fuels for use in various types of nuclear reactors.

BACKGROUND OF THE INVENTION

The statements in the background of the invention are provided to assist with understanding the invention and its applications and uses, and may not constitute prior art.

Breed-and-burn nuclear fission reactors allow for much higher "fuel utilization" (total energy extracted per initial uranium atom) than traditional fission reactors due to their conversion (breeding) of uranium into plutonium, instead of merely burning a small portion of the uranium. This allows large fission reactors to sport superior economics and much less waste while also allowing the earth's natural uranium and thorium resources to last much longer-hundreds of years of sustainable "clean air" energy for the entire planet.

However, existing fuel types for these types of nuclear reactors come with a number of limitations. Therefore, it would be an advancement in the state of the art to develop an improved nuclear fuel for use in nuclear reactors, including but not limited to breed-and-burn reactors. It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

It would be an advancement in the state of the art to develop a nuclear fuel for use in various types of nuclear reactors. Therefore, embodiments of a nuclear fuel element for use in various types of nuclear reactors are disclosed.

According to a first aspect or in one embodiment, a nuclear fuel element is provided. The nuclear fuel element may comprise a plurality of solid nuclear fuel particles. Each of the plurality of solid nuclear fuel particles may comprise a nuclear material. The nuclear fuel element may comprise a non-solid matrix. The plurality of solid nuclear fuel particles may be intermixed in the non-solid matrix. The non-solid matrix may be substantially stagnant relative to the plurality of nuclear fuel particles. The non-solid matrix may comprise a material selected from the group consisting of a liquid metal, a liquid metal alloy, and a liquid salt.

In some embodiments, the plurality of solid nuclear fuel particles comprises tristructural-isotropic (TRISO) particles.

In some embodiments, the non-solid matrix is selected from the group consisting of a liquid metal and a liquid metal alloy.

In some embodiments, the non-solid matrix is selected from the group consisting of tin, lead, sodium, aluminum, bismuth, zinc, magnesium, calcium, cerium, rubidium, zirconium, beryllium, potassium, yttrium, strontium, barium, and alloys thereof.

In some embodiments, the non-solid matrix comprises a metalloid. In some embodiments, the non-solid matrix further comprises an element selected from the group consisting of silicon and germanium.

In some embodiments, the non-solid matrix is selected from the group consisting of tin, tin-aluminum alloy, tin-aluminum-gallium alloy, tin-zinc-aluminum alloy, tin-magnesium alloy, tin-aluminum-magnesium alloy, and tin-magnesium-zinc alloy.

In some embodiments, a composition percent of tin in the non-solid matrix is more than 80 percent tin by mass fraction. In some embodiments, a composition percent of tin in the non-solid matrix is more than 90 percent tin by mass fraction.

In some embodiments, the non-solid matrix is selected from the group consisting of lead, lead-bismuth-tin alloy, and lead-magnesium alloy.

In some embodiments, the non-solid matrix is selected from the group consisting of sodium-lead alloy, sodium-lead-bismuth alloy, and sodium-bismuth alloy.

In some embodiments, the non-solid matrix is selected from the group consisting of lead-bismuth alloy and lead-bismuth eutectic.

In some embodiments, the non-solid matrix is liquid sodium.

In some embodiments, the non-solid matrix is liquid gallium.

In some embodiments, the non-solid matrix comprises an alloy selected from the group consisting of an alloy of tin, aluminum, and gallium; an alloy of tin, aluminum, lead, and bismuth; an alloy of lead and magnesium; an alloy of aluminum and magnesium; an alloy of magnesium and zinc; an alloy of bismuth and sodium; and an alloy of lead and sodium.

In some embodiments, the non-solid matrix comprises an alloy selected from the group consisting of an alloy of lead and lithium; an alloy of tin and lithium; and an alloy of lead, bismuth, and lithium.

In some embodiments, the non-solid matrix comprises liquid salt.

In other embodiments, the non-solid matrix further comprises a material selected from the group consisting of water, sulfur, a supercritical fluid, organic liquid, and inorganic liquid.

In some embodiments, the plurality of solid nuclear fuel particles comprises tristructural-isotropic (TRISO) particles. The non-solid matrix may be selected from the group consisting of tin-aluminum alloy, tin-aluminum-gallium alloy, lead-bismuth alloy, and lead.

In some embodiments, the plurality of solid nuclear fuel particles comprises particles selected from the group consisting of tristructural-isotropic (TRISO) particles, bistructural-isotropic particles, and quadristructural-isotropic particles.

In some embodiments, at least one of the plurality of solid nuclear fuel particles comprises one or more materials selected from the group consisting of a ceramic material, a metallic material, a carbon material, and a cermet material.

In some embodiments, at least one of the plurality of solid nuclear fuel particles comprises actinide fuel kernels.

In some embodiments, at least one of the plurality of solid nuclear fuel particles comprises a fuel kernel selected from the group consisting of a UN kernel, a UO2 kernel, a UC kernel, a UCO kernel.

In some embodiments, the nuclear material is selected from the group consisting of a fissionable material, a transmutation material, and a fertile material.

In some embodiments, the plurality of solid nuclear fuel particles comprises fissionable material selected from the group consisting of uranium, thorium, and plutonium.

In other embodiments, the plurality of solid nuclear fuel particles comprises transmutation or fertile materials selected from the group consisting of thulium, thallium, gadolinium, silver, strontium, holmium, and lithium.

In some embodiments, each of the plurality of solid nuclear fuel particles has a volume smaller than 0.5 cm3 and larger than 6×10−7 cm3.

In some embodiments, each of the plurality of solid nuclear fuel particles has a volume smaller than 1.5×10−2 cm3 and larger than 6×10−7 cm3.

In some embodiments, the non-solid matrix is approximately a same density as the plurality of solid nuclear fuel particles.

In some embodiments, the non-solid matrix is less dense than the plurality of solid nuclear fuel particles.

In some other embodiments, the non-solid matrix is more dense than the plurality of solid nuclear fuel particles.

In some embodiments, the nuclear fuel element creates energy in a nuclear reactor selected from the group consisting of a fast spectrum fission reactor, a thermal spectrum fission reactor, an epithermal spectrum fission reactor, and a fission-fusion hybrid reactor.

In some embodiments, the nuclear fuel element creates energy in a nuclear reactor cooled by a coolant selected from the group consisting of a liquid metal coolant, liquid salt coolant, gas coolant, a water coolant, and heat pipes.

A nuclear fuel core for use in various nuclear fuel reactors is also provided. In some embodiments, a nuclear fuel core comprises a plurality of solid nuclear fuel particles, where each of the plurality of solid nuclear fuel particles comprises a nuclear material; a non-solid matrix, where the plurality of solid nuclear fuel particles is intermixed in the non-solid matrix, the non-solid matrix is substantially stagnant relative to the plurality of nuclear fuel particles, and the non-solid matrix comprises a material selected from the group consisting of a liquid metal, a liquid metal alloy, and a liquid salt; and a plurality of coolant tubes penetrating the non-solid matrix, where each of the plurality of coolant tubes contains a flowing coolant.

A nuclear reactor is also provided. In some embodiments, the nuclear reactor comprises a power generation loop, and a reactor. In some embodiments, the reactor comprises a nuclear fuel element and a coolant. In some embodiments, the nuclear fuel element comprises a plurality of solid nuclear fuel particles, where each of the plurality of solid nuclear fuel particles comprises a nuclear material; and a non-solid matrix. In some embodiments, the plurality of solid nuclear fuel particles is intermixed in the non-solid matrix. In some embodiments, the non-solid matrix is substantially stagnant relative to the plurality of solid nuclear fuel particles. In some embodiments, the non-solid matrix comprises a material selected from the group consisting of a liquid metal, a liquid metal alloy, and a liquid salt.

Various nuclear fuel cores having the nuclear fuel element described herein, as well as methods of manufacture of the nuclear fuel element, are within the scope of the present invention, as shown and described herein.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. Reference will now be made in detail to the embodiments consistent with the present invention, examples of which are illustrated in the accompanying drawings. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

The present invention relates to a fuel design. According to one embodiment, the invention is described in connection with a breed-and-burn sodium-cooled fast reactor. The various embodiments of the invention may be used, or modified for use, in any other types of nuclear systems, including but not limited to fission reactors, fusion reactors, radioisotope energy systems, and accelerator systems.

Context of Nuclear Reactors

Figure 1:
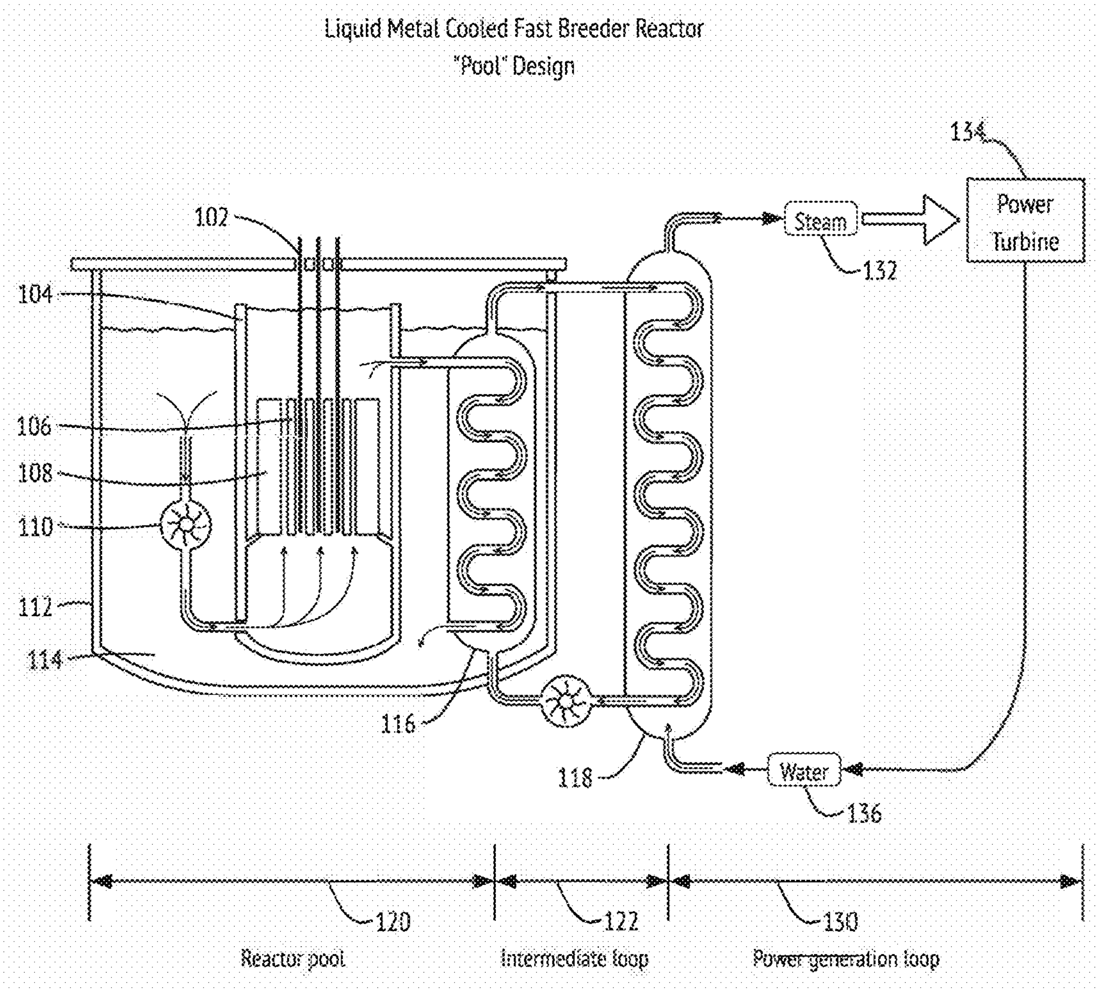
FIG. 1 (Prior Art)
FIG. 1 illustrates a fast breed-and-burn, or breeder, nuclear reactor with a pool design, according to one example reactor in the prior art.

FIG. 1 illustrates a fast breed-and-burn, or breeder, nuclear reactor with a pool design, according to one example reactor in the prior art. The reactor is characterized by its liquid metal coolant pool 114, typically filled with sodium or lead, which serves to cool the reactor core and facilitate heat transfer. The reactor typically contains a solid fissile fuel core 106, which is the primary source of nuclear fission. In existing designs, this core is typically composed of a mix of fertile and fissile isotopes embedded in a solid matrix material, often graphite. The solid fuel core 106 is immersed in the liquid metal coolant 114 which is pumped within the reactor pool 120 by a reactor pool pump 110, and which circulates in the reactor pool 120. The solid fuel core 106 may be surrounded by a breeder blanket 108 of fertile material, which serves to capture any escaping neutrons and convert them into additional fissile material, further enhancing the efficiency of the reactor. The fuel core may also be surrounded by a neutron reflector, which may comprise of liquid lead (Pb). Integrated within the reactor are control rods 102, which may be inserted or withdrawn to manage the fission reaction rate. These rods are made of materials that absorb neutrons, such as boron or cadmium, and their movement may be adjusted to maintain the desired level of reactivity within the core. Surrounding the reactor is biological shielding 112, which may consist of materials such as concrete or lead, designed to protect personnel and the environment from radiation emitted during reactor operation.

The solid fuel core 106 generates heat through the process of nuclear fission, and the heat is transferred to the liquid metal coolant 114 that surrounds the fuel core 106. A heat exchanger 116 facilitates the transfer of heat from the liquid metal coolant 114 in the reactor pool 120 to the intermediate loop 122. In the power generation loop 130, the heat of the liquid metal coolant is used in steam generator 118 to generate steam 132 which powers a power turbine 134 to generate electricity. Water 136 flows from the power turbine 134 back to the steam generator 118. A flow baffle 104 may be positioned in the reactor pool 120 to promote coolant flow and enhance heat transfer from the fuel core 106 to the liquid metal coolant 114 inside the reactor pool 120.

Figure 2:
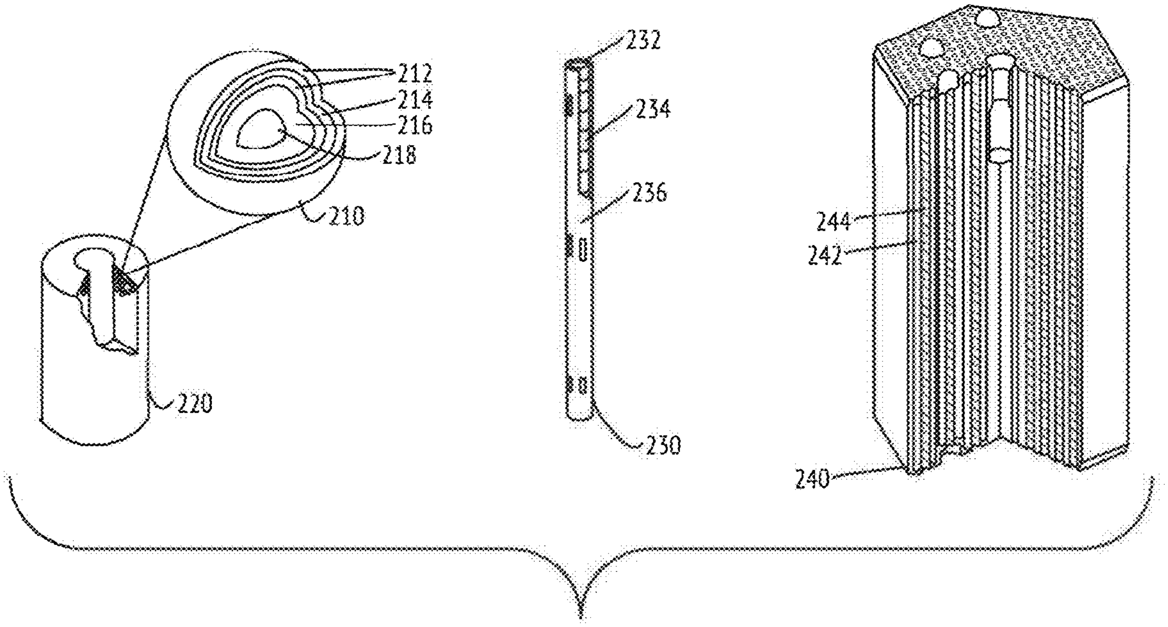
FIG. 2 (Prior Art)
FIG. 2 illustrates a packing of fuel particles according to the prior art.

FIG. 2 illustrates the packing of fuel particles 210 according to the prior art. Fuel particles 210 are packed in solid nuclear fuel compacts 220, which are placed within solid fuel rods 230, which are subsequently arranged within a solid fuel assembly 240 along with coolant tubes 244. A tristructural-isotropic (TRISO) fuel particle 210 is shown in a magnified three-dimensional cutaway view, according to one embodiment of the present invention. At the core of the particle is the fuel kernel 218, typically composed of uranium, thorium, or plutonium. This fuel kernel acts as the primary source of nuclear fission. Surrounding the fuel kernel 218 is a porous carbon buffer layer 216. This layer is designed to absorb fission gasses and mitigate stress on the outer layers caused by the heat and radiation from the fuel kernel. Encasing the porous carbon buffer layer 216 is one of the two pyrolytic carbon layers 212. This inner pyrolytic carbon layer is dense and serves as an additional barrier to the escape of fission products. The next layer 214 is composed of silicon carbide, a material known for its excellent heat resistance and mechanical strength. This silicon carbide layer 214 provides a robust barrier against the release of fission products, even under extreme conditions. Finally, the outermost layer is another layer of pyrolytic carbon 212, similar to the inner layer of pyrolytic carbon. This outer layer provides additional containment and protection to the fuel kernel 218. The multi-layered design of TRISO particles is integral to their role in enhancing the safety of nuclear reactors.

Next, the TRISO particles 210 are embedded within solid fuel compacts 220 which are in turn stacked in fuel rods 230, which house the fuel compacts 234, of which the fuel compact 220 is one instance, in a graphite sleeve 236. The fuel rods are positioned within channels in the fuel assemblies 240 of the reactor core, alongside coolant tubes 224. In more detail, the solid fuel compacts 220, housing numerous TRISO particles, are intended to provide an additional layer of containment and to facilitate efficient heat transfer. The solid fuel compacts 234 are typically made of a graphite matrix and are arranged within a fuel rod 230 which may have an encompassing graphite sleeve 236 and a plug 232 to secure the fuel compacts 234 within the fuel rod. The fuel rods 242, of which fuel rod 230 is one instance, are arranged within a fuel assembly 240 in close proximity to coolant tubes. The fuel assemblies 240 are typically composed of a solid, high-strength, corrosion-resistant material such as zirconium alloy, which is able to withstand the high temperatures and pressures within the reactor core. The coolant tubes 244, which are filled with liquid sodium coolant, are intended to maintain the temperature of the reactor core by removing the heat generated during fission. However, this arrangement of solid fuel compacts 234 in a solid fuel assembly 240 with liquid sodium coolant tubes 244 poses stability issues due to the positive "void worth" of the sodium coolant, which leads to an undesirable positive reactivity feedback of the reactor. The present invention addresses this issue and other issues associated with related embodiments, using a novel fuel design.

Improved Nuclear Fuel and Fuel Core Design

Figure 3:
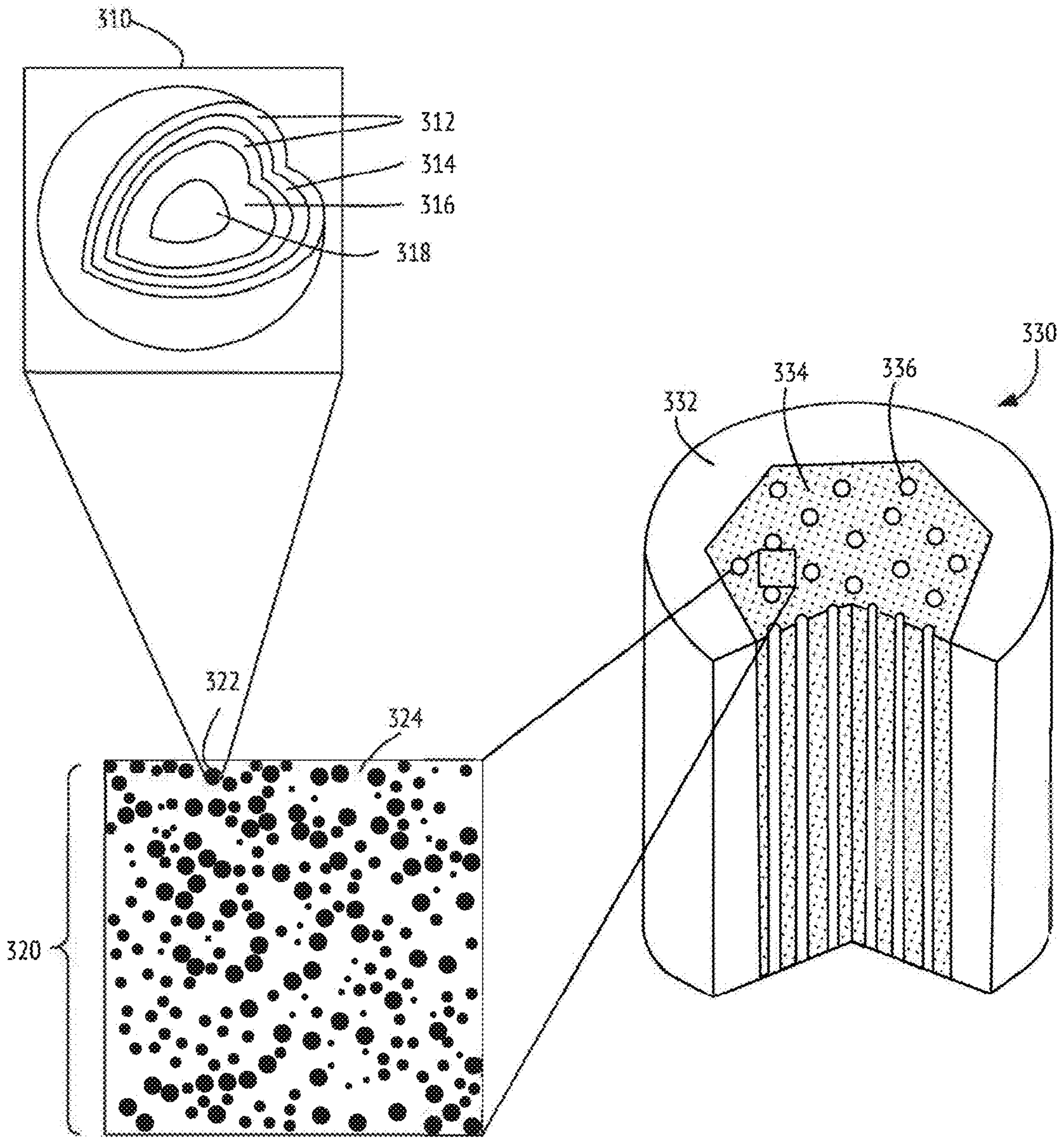
FIG. 3 illustrates a magnified cross-sectional view of a fuel particle, a second magnified cross-sectional view of the fuel particle in a stagnant matrix, and a fuel particle and stagnant matrix packing in a fuel core, according to embodiments of the present invention.
Figure 8:
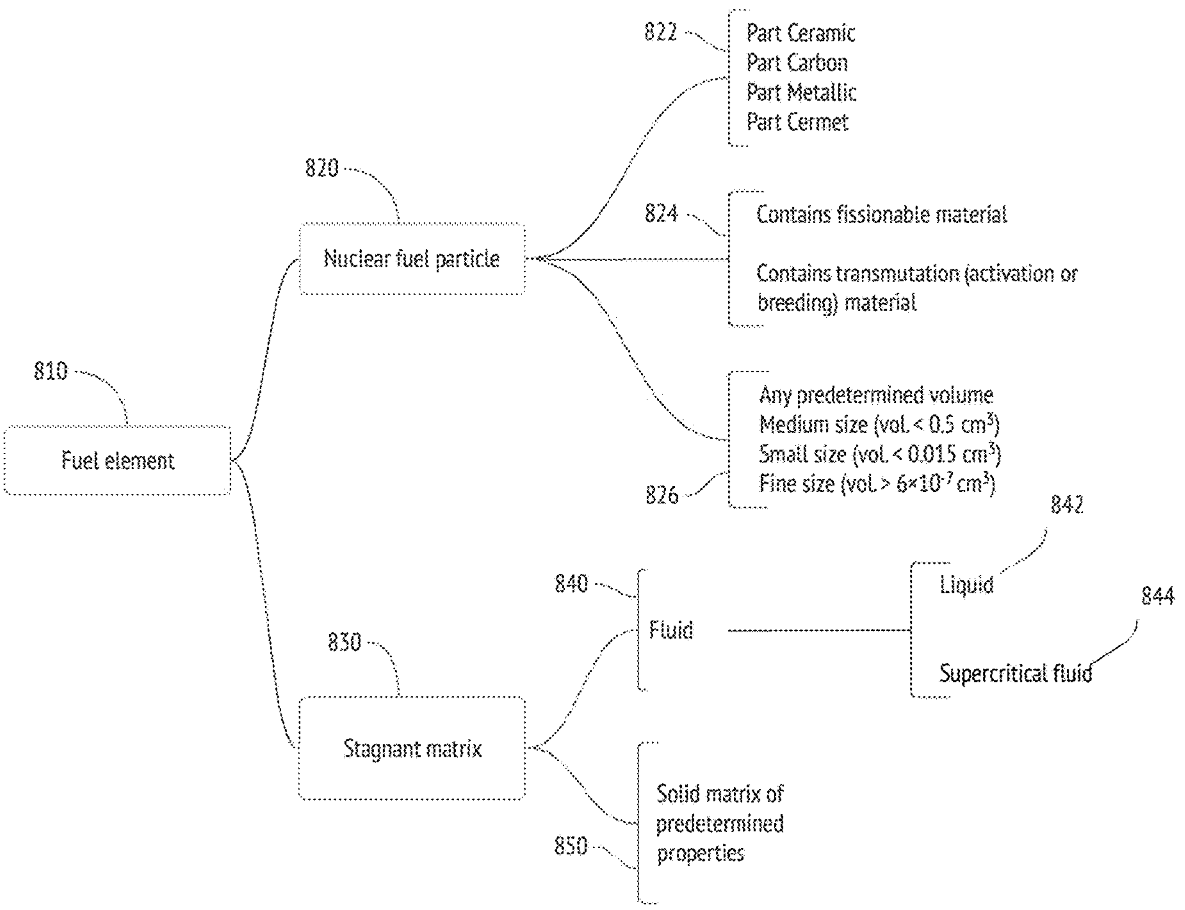
FIG. 8 illustrates alternative embodiments for the fuel particle and the stagnant matrix, according to embodiments of the present invention.
Figure 9:
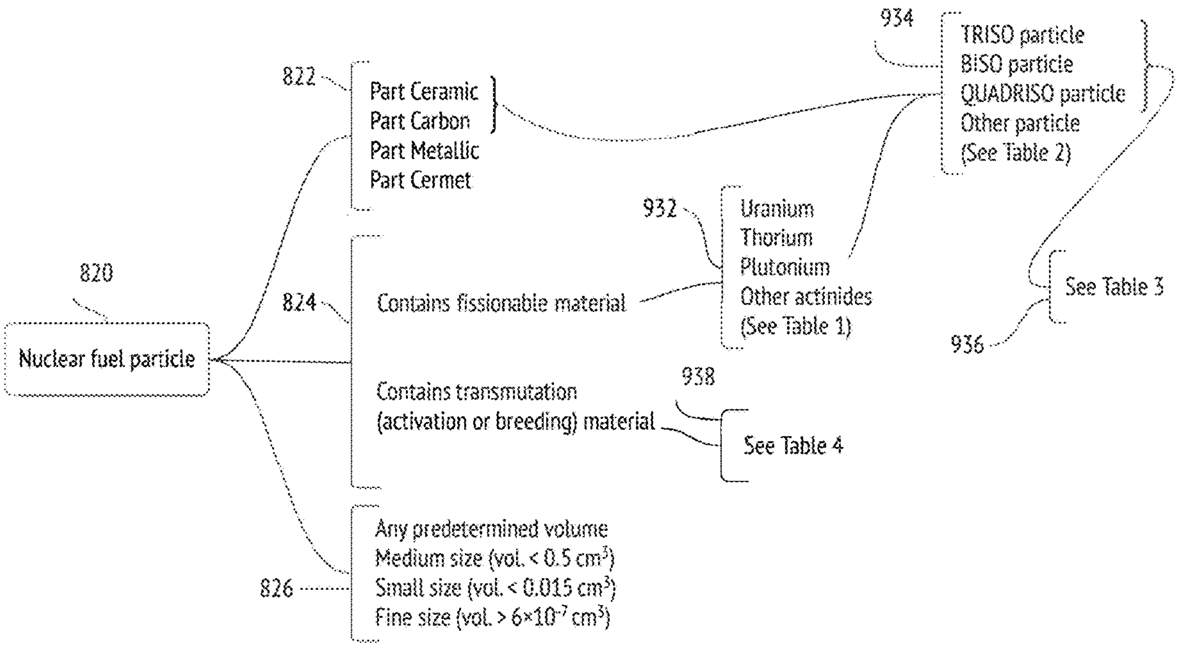
FIG. 9 illustrates alternative embodiments for the fuel particle, according to embodiments of the present invention.
Figure 10:
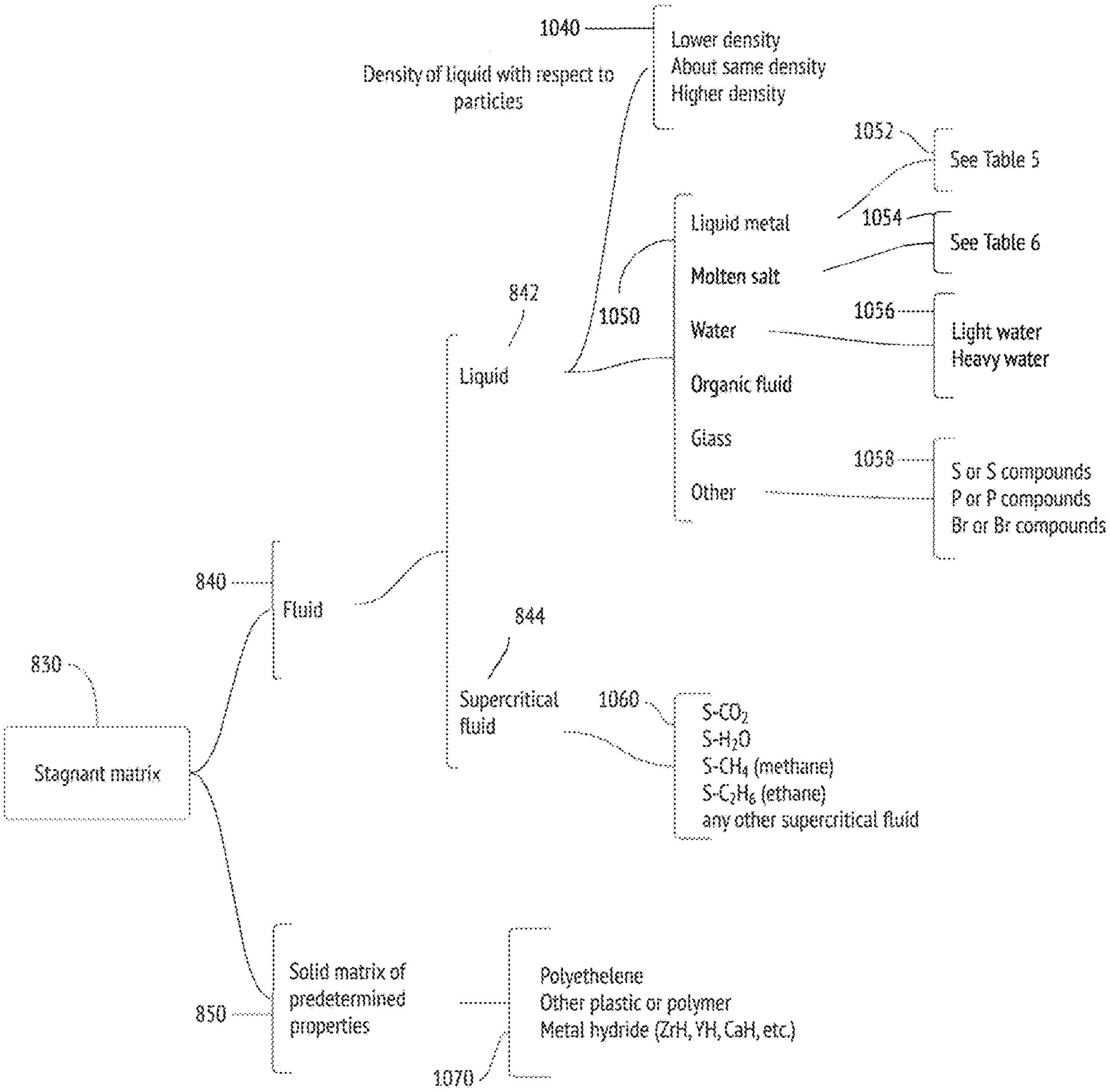
FIG. 10 illustrates alternative embodiments for the stagnant matrix, according to embodiments of the present invention.

FIG. 3 illustrates a nuclear fuel element 320, according to an embodiment of the present invention. The fuel element 320 comprises a nuclear fuel particle 322, intermixed in a substantially stagnant matrix 324. As used herein, "stagnant" refers to the matrix's negligible relative motion with respect to the TRISO fuel particles. The matrix is substantially stagnant in that it is stationary relative to the fuel particles except for thermal expansion and mixing. Fuel particles that are intermixed in a matrix may be immersed, submersed, suspended, embedded, or floated in the matrix. The matrix is not a coolant, does not flow through a turbine or extra-core heat exchanger, and is stationary relative to the fuel particles except for the aforementioned thermal expansion and mixing. Alternative material choices for the fuel particle 322 and the stagnant matrix 324 are shown in FIGS. 8-10.

The fuel particles 322 are intermixed, at a high-volume packing fraction, in the stagnant matrix 324. In some embodiments, the density of the stagnant matrix 324 is substantially the same as the density of the fuel particle 322. In other embodiments, the density of the stagnant matrix 324 is less than the density of the fuel particle 322, and in yet other embodiments, the density of the stagnant matrix 324 is greater than the density of the fuel particle 322. In some embodiments, the fuel particles 322 are spherical in shape. Note that when the fuel element 320 is presented in two-dimensional (2D) cross-sectional slices as shown, the apparent volumetric packing fraction of the spherical particles is lower than the actual three-dimensional (3D) volumetric packing fraction. However, it would be apparent to those skilled in the art to extend the teachings of this disclosure to use any type of spherical fuel particle in any type of matrix at any packing fraction.

In some embodiments, the substantially stagnant matrix 324 is a non-solid matrix. According to one embodiment, the substantially stagnant matrix 324 may be a mixture of liquid lead (Pb) and liquid sodium (Na), e.g., a mixture of 60% lead and 40% sodium. The liquid lead is denser than the fuel particle 322. The liquid sodium is less dense than the fuel particle 322. According to another embodiment, the stagnant matrix 324 may be a mixture of lead (Pb) and lithium (Li). Additional embodiments are described in the section Alternative Embodiments for Fuel Element Composition.

According to one embodiment, the nuclear fuel particles 322 intermixed in the stagnant matrix 324 may be TRISO fuel particles. An embodiment of fuel particle 322 comprising a TRISO fuel particle is shown in a magnified three-dimensional cutaway view 310. At the core of the fuel particle is the fuel kernel 318, typically composed of uranium, thorium, or plutonium. This fuel kernel 318 acts as the primary source of nuclear fission. Surrounding the fuel kernel 318 is a porous carbon buffer layer 316. This layer is designed to absorb fission gasses and mitigate stress on the outer layers caused by the heat and radiation from the fuel kernel. Encasing the porous carbon buffer layer 316 is one of the two pyrolytic carbon layers 312. This inner pyrolytic carbon layer is dense and serves as an additional barrier to the escape of fission products. The next layer 314 is composed of silicon carbide (SiC), a material known for its excellent heat resistance and mechanical strength. This silicon carbide layer 314 provides a robust barrier against the release of fission products, even under extreme conditions. Finally, the outermost layer is another layer of pyrolytic carbon 312, similar to the inner layer of pyrolytic carbon. This outer layer provides additional containment and protection to the fuel kernel 318. The multi-layered design of TRISO particles is integral to their role in enhancing the safety of nuclear reactors.

As further elaborated in the Simulation Results section and the section on Advantages over Existing Designs, in some embodiments, when the stagnant matrix surrounding the fuel particles is in liquid form, it has high thermal expansion, which provides a negative reactivity feedback that dominates any positive reactivity feedback from sodium coolant, which is present in sodium-cooled reactor designs. The use of TRISO fuel particles in some embodiments further provides containment of fission products within the fuel particles, preventing undesirable reactions between fission products in the larger fuel core. Overall, the fuel element of the present invention allows for high fuel utilization with safe, stable reactivity, and a very low radiation release risk.

The configurations and/or compositions of the fuel particle 322 are not limited to the embodiment(s) described above. Instead, it should be understood that a fuel particle 322 consistent with the present disclosure may include one or more additional layers, or may omit one or more layers, depending on the desired properties of the fuel particle 322.

The fuel design disclosed may be extended to any solid macroscopic ceramic particles (e.g., TRISO particles) intermixed in any matrix (e.g., liquid metal, molten salt), where intermixing comprises immersion, submersion, suspension, or flotation of the particles. Further embodiments are described in the following section.

In some embodiments, the nuclear fuel 334, which comprises the nuclear fuel element 320, including the substantially stagnant matrix 324 and intermixed nuclear fuel particles 322, may be contained inside a large vat 332, inside a nuclear fuel core 330. The nuclear fuel 334 is penetrated by a plurality of coolant tubes 335. The plurality of coolant tubes contains a coolant, used to remove or transfer the heat from the fuel core 330. The nuclear fuel 334, comprising a stagnant matrix containing intermixed fuel particles, fills the entire volume inside the vat 332 of the fuel core 330, except for the coolant tubes 335 that contain coolant.

According to one embodiment, the fuel core 330 may be a nuclear reactor core. In some embodiments, the inner part of fuel core 332 exhibits a ⅙ symmetry (e.g., hexagonal cross-section that is invariant under rotations by integer multiples of 60 degrees). The coolant tubes 336 may be formed of a material that is able to withstand extremely high radiation damage over a long period of time, e.g., ceramic.

In some embodiments, the ceramic material is silicon carbide (SiC) or zirconium carbide (ZrC).

Figure 4:
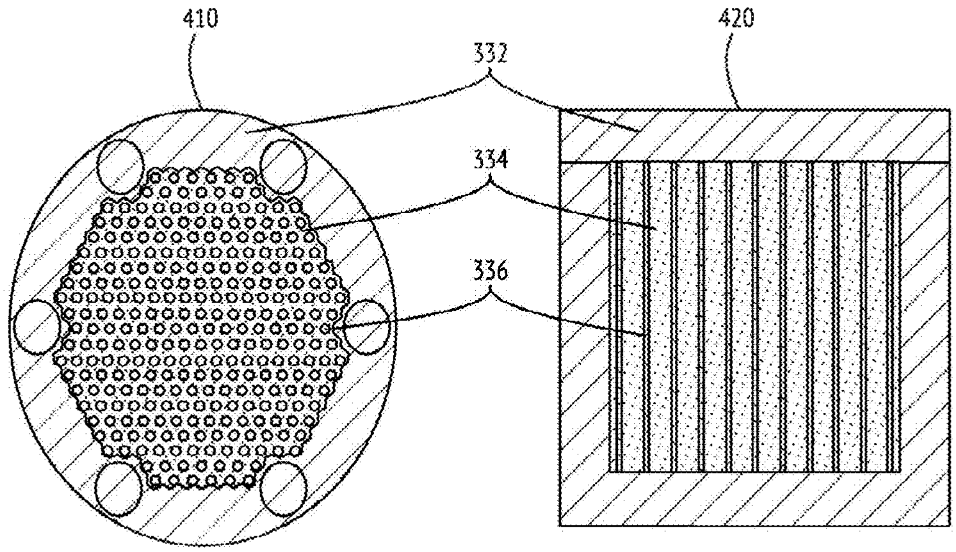
FIG. 4. illustrates magnified cross-sectional views of a fuel core comprising fuel particles and stagnant matrix in a containment vessel, according to embodiments of the present invention.

FIG. 4 illustrates a top view 410 and side view 420 of the nuclear fuel core 330 initially described in FIG. 3, according to one embodiment of the present invention. The fuel core 330 comprises a large vat 332 that comprises a nuclear fuel element 334, which comprises a substantially stagnant matrix and intermixed nuclear fuel particles. The particles-in-matrix fuel element 334 is pierced by a plurality of coolant tubes 336.

Figure 5:
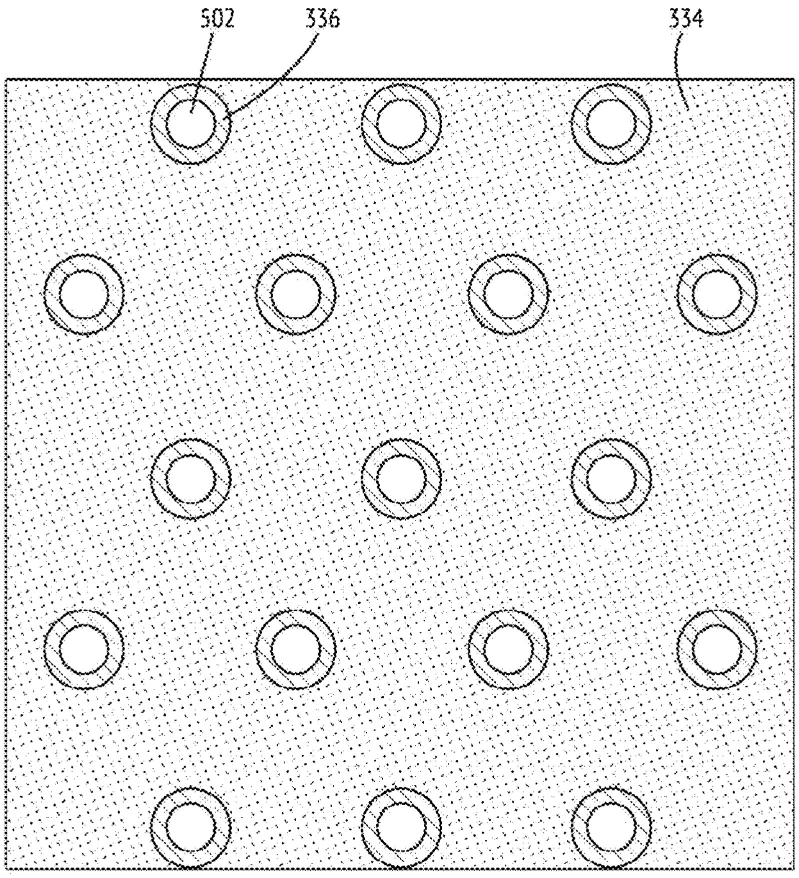
FIG. 5 illustrates another magnified cross-sectional views of a fuel core comprising fuel particles and stagnant matrix in a containment vessel, according to embodiments of the present invention.

FIG. 5 illustrates a first magnified cross-sectional view of the nuclear fuel element 334 comprising a substantially stagnant matrix and intermixed fuel particles, where the stagnant matrix is pierced by a plurality of coolant tubes 336, according to one embodiment of the present invention. The coolant tubes 336 may contain a separate flowing coolant 502.

Figure 6:
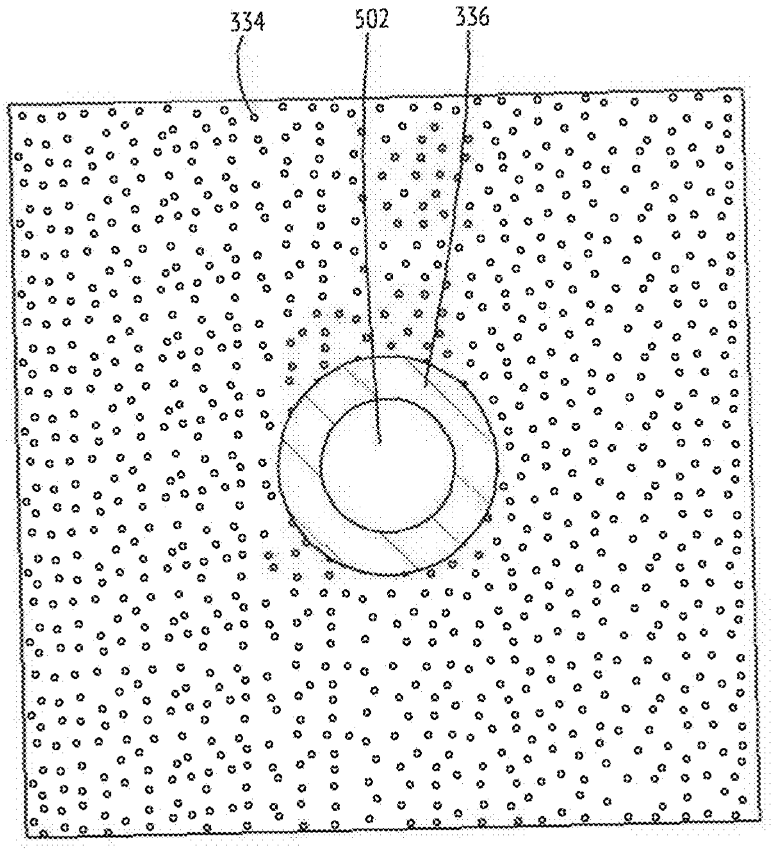
FIG. 6 illustrates yet another magnified cross-sectional views of a fuel core comprising fuel particles and stagnant matrix in a containment vessel, according to embodiments of the present invention.

FIG. 6 illustrates a second magnified cross-sectional view of a fuel element 334 and a coolant tube 336, according to one embodiment of the present invention. The fuel element 334 may comprise a substantially stagnant matrix intermixed with a plurality of fuel particles. The particle-in-matrix fuel element 334 is further pierced by a tube 336 containing a separate flowing coolant 502. In one embodiment, the coolant 502 may be a liquid sodium (Na) coolant.

Figure 7:
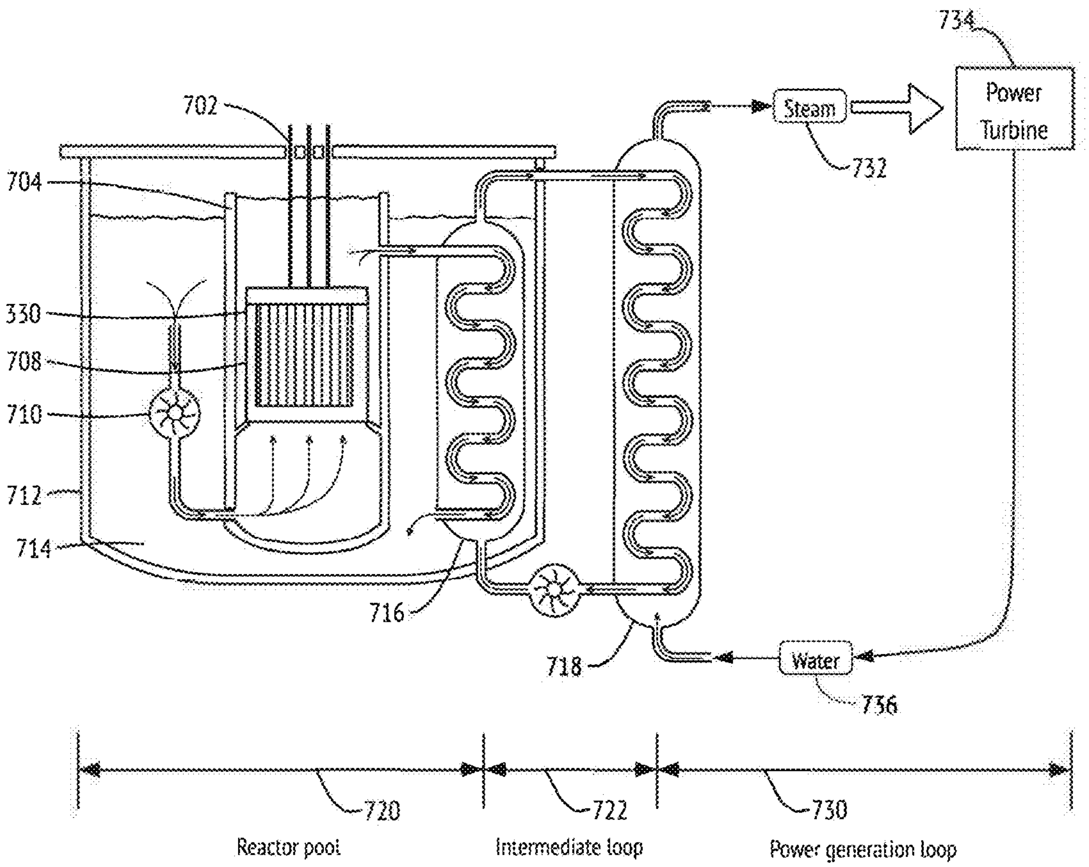
FIG. 7 illustrates a nuclear fuel reactor with a novel fuel core, according to an example embodiment of the present invention.

FIG. 7 illustrates an example embodiment of a fast breed-and-burn nuclear reactor with a pool design that utilizes a novel fuel core 330 with the novel fuel element, according to some embodiments of the present invention. At the heart of the reactor is the innovative fuel core 330, comprising fuel particles intermixed in a stagnant matrix. In one embodiment, the fuel core 330, which was previously illustrated in FIG. 3 with top and side cross-sectional views illustrated in FIG. 4, is composed of fuel particles immersed in a substantially stagnant matrix of the same density as the fuel particles, such that the fuel particles are suspended in the matrix. Recall that here, "stagnant" refers to the negligible relative motion of the matrix with respect to the fuel particles. The fuel core is pierced by a number of coolant tubes which contain a separate flowing coolant. In some embodiments, the coolant tubes are ceramic coolant tubes, and the flowing coolant is liquid sodium or lead. In some embodiments, the fuel particles are TRISO fuel particles.

The coolant flows from a liquid metal coolant 714 in the reactor pool 720. The liquid metal coolant 714 typically filled with sodium or lead, serves to cool the reactor fuel core 330 and facilitate heat transfer. The liquid metal coolant 114 which is pumped within the reactor pool 720 by a reactor pool pump 710, and which circulates in the reactor pool 720. The fuel core 330 may be surrounded by a breeder blanket 708 of fertile material, which serves to capture any escaping neutrons and convert them into additional fissile material, further enhancing the efficiency of the reactor. The fuel core may also be surrounded by a neutron reflector, which may comprise of liquid lead (Pb).

The fuel core 330 generates heat through the process of nuclear fission, and the heat is transferred to the liquid metal coolant 714 that surrounds the fuel core 330 and flows through the coolant tubes in the fuel core 330. A heat exchanger 716 facilitates the transfer of heat from the liquid metal coolant 714 in the reactor pool 720 to the intermediate loop 722. In the power generation loop 730, the heat of the liquid metal coolant is used to generate steam 732 which powers a power turbine 734 to generate electricity. Water 736 flows from the power turbine 734 back to the steam generator 718. A flow baffle 704 may be positioned in the reactor pool 720 to promote coolant flow and enhance heat transfer from the fuel core 330 to the liquid metal coolant 714 inside the reactor pool 720.

Alternative Embodiments for Fuel Element Composition

FIG. 8 presents a tree diagram illustrating various potential embodiments of the present invention. The chart begins with the primary concept of the fuel element 810 at the root, branching out into two main categories: the nuclear fuel particle 820, with a corresponding subtree rooted at 820, and the stagnant matrix 830, with a corresponding subtree rooted at 830. As described, the fuel particles are intermixed in the matrix, which is substantially stationary with respect to the fuel particles.

The subtree rooted at the nuclear fuel particle 820 further divides into various types of fuel particles that could be used, including various materials 822 used in the fuel particle, the compositions 824 of the fuel particle kernel, and sizes 826 of the fuel particles. Each of these fuel types is further subdivided into different possible configurations, as detailed in FIG. 9.

Subtree 830 for the stagnant matrix explores the different materials that could be used to form the matrix in which the fuel particles are intermixed. This includes branches for fluids 840, including liquids 842 and supercritical fluids 844, as well as solids of predetermined properties 850 composing the matrix. Each sub-branch is further divided into different possible properties, compositions and structures, such as different density values relative to the density of the fuel particles and material composition, as further detailed in FIG. 10.

The tree diagram of FIG. 8 illustrates the versatility and adaptability of present invention on fuel design, highlighting its potential for customization to meet specific reactor requirements or operational conditions.

FIG. 9 presents a tree diagram illustrating subtree rooted at the nuclear fuel particle 820, branching from the tree initially introduced in FIG. 8 and illustrates various embodiments of the present invention. It is to be understood that these examples are not intended to limit the scope of the present disclosure, but are provided as possible implementations. The nuclear fuel particle may be comprised of different materials 822, including but not limited to, ceramic, carbon, and metallic materials. In some embodiments, the nuclear fuel particles may also be comprised of cermet materials. Cermets, as composite materials composed of ceramic and metallic components, could provide a balance between the high-temperature resistance and hardness of ceramics and the thermal conductivity of metals. This balance could potentially enhance the performance of the fuel particles, particularly in the high-temperature environments typically encountered within a nuclear reactor. The ceramic component of the cermet could be engineered to encapsulate the nuclear fuel, while the metallic component could facilitate the conduction of heat away from the fuel, thereby contributing to the overall efficiency and safety of the reactor operation. Examples of part ceramic and part carbon nuclear fuel particles include the particles in the group 934 and listed in Table 2. Further, Table 3 lists types of fuel kernels that may be used within the group 936 of TRISO particles, bistructural-isotropic (BISO) particles, and quadristructural-isotropic (QUADRISO) particles, in some embodiments of the present invention. The nuclear fuel particles may have various fuel compositions 824, including but not limited to fissionable material, transmutation material, and fertile material, including material used for activation, breeding, or radioisotope production. Table 1 lists fissionable materials 932, including but not limited to uranium, thorium, plutonium, and other actinides, that may be used in the nuclear fuel particles in some embodiments of the present invention. Table 4 lists transmutation materials 938 for activation, breeding, or radioisotope production that may be used in the fuel particles in some embodiments of the present invention. The nuclear fuel particle may also be of various sizes 826, including but not limited to any predetermined volume, medium size (with volume <0.5 $cm^3$), small size (with volume <0.015 $cm^3$), or fine size (with any volume $>6\times10^{-7}$ $cm^3$ and volume <0.015 $cm^3$). The nuclear fuel particles may be larger than $6\times10^{-7}$ $cm^3$. The sizes mentioned are not intended to limit the scope of the present disclosure, but are provided as possible implementations.

FIG. 10 presents a tree diagram illustrating the subtree rooted at the stagnant matrix 830, which is a branch of the tree initially introduced in FIG. 8, and illustrates various embodiments of the present invention. The stagnant matrix 830, designed to intermix nuclear fuel particles, may be constituted by either a non-solid matrix or a solid matrix with predetermined properties. The non-solid matrix may comprise a fluid 840, which may be further categorized into a liquid 842 or a supercritical fluid 844.

The liquid matrix 842 may exhibit various densities 1040 with respect to the intermixed particles, including but not limited to a density that is lower, equivalent, or higher than the nuclear fuel particles dispersed within it. The compositions 1050 of the liquid matrix may include, but are not limited to, liquid metal, liquid metal alloys, liquid metalloids, molten salt, water, organic fluid, glass, or other suitable materials. Specific examples of liquid metals 1052 and molten salts 1054 that may be utilized in the matrix are enumerated in Table 5 and Table 6, respectively. In some embodiments, the liquid matrix comprises a liquid metal alloy of Sn—Al. In some embodiments, the matrix comprises tin, lead, sodium, aluminum, bismuth, zinc, magnesium, calcium, cerium, rubidium, zirconium, silicon, beryllium, potassium, yttrium, strontium, germanium, barium, and alloys thereof. The stagnant matrix may comprise metals and metalloids, such as silicon and germanium. In some embodiments, the matrix comprises tin, tin-aluminum alloy, tin-aluminum-gallium alloy, tin-zinc-aluminum alloy, tin-magnesium alloy, tin-aluminum-magnesium alloy, and tin-magnesium-zinc alloy. For tin alloys, a composition percent of tin of more than 80 percent, or alternatively more than 90 percent, tin by mass fraction may be used. In some embodiments, the matrix comprises a liquid metal or liquid metal alloy of lead, lead-bismuth-tin alloy, lead-magnesium alloy, sodium-lead alloy, sodium-lead-bismuth alloy, sodium-bismuth alloy, lead-bismuth alloy or lead-bismuth eutectic. The matrix may also comprise liquid sodium or liquid gallium. In some embodiments, the matrix may comprise an alloy of tin, aluminum, and gallium; an alloy of tin, aluminum, lead, and bismuth; an alloy of lead and magnesium; an alloy of aluminum and magnesium; an alloy of magnesium and zinc; an alloy of bismuth and sodium; or an alloy of lead and sodium. In some embodiments, the matrix may comprise an alloy of lead and lithium; an alloy of tin and lithium; or an alloy of lead, bismuth, and lithium. In some embodiments, the matrix may further comprise liquid salt, water, sulfur, a supercritical fluid, and/or another organic or inorganic liquid or semi-liquid. Note that in the Pb—Al and Pb—Bi—Al embodiments featured in Table 5, liquid Al sits atop liquid Pb since Pb and Al do not alloy, and fuel particles of intermediate density are suspended around the Al—Pb boundary.

The water used in the matrix may comprise the options 1056 of light water or heavy water. In some embodiments, liquid matrices may be composed of other materials 1058 including but not limited to S or S compounds, P or P compounds, and Br or Br compounds. Supercritical fluids 844 may also be employed as a matrix, and include materials 1060 such as S—CO2, S—H2O, S—CH4, S—C2H6, among others. For the solid matrix of predetermined properties 850, materials 1070 such as polyethylene, other plastics or polymers, and metal hydrides (including but not limited to ZrH, YH, CaH) may be used in accordance with some embodiments of the present disclosure.

Tables 1 to 4 show material compositions of alternatives for fuel particles. Tables 5 to 6 show material compositions of alternatives for stagnant matrices.

TABLE 1

| Material Composition Alternatives for Fissionable Materials Used in Fuel Particle (See FIG. 9) |
|---|
| uranium |
| thorium |
| plutonium |
| other actinides |

TABLE 2

| Material Composition Alternatives for Fuel Particles (See FIG. 9) |
|---|
| TRISO particle |
| BISO particle |
| QUADRISO particle |
| other particle |

TABLE 3

| Material Composition Alternatives for Fuel Kernel Used in Fuel Particles (See FIG. 9) |
|---|
| UN kernel |
| $UO_2$ kernel |
| UC kernel |
| UCO kernel |
| other actinide kernel compound |

TABLE 4

Materials for Fuel Particles Used in Transmutation (Activation, Breeding or Radioisotope) (See FIG. 9)

| Preferred Embodiments | Alternative Embodiments | |
|---|---|---|
| thulium | iridium | hafnium |
| thallium | europium | neodymium |
| gadolinium | cesium | cobalt |
| silver | scandium | promethium |
| lithium | holmium | protactinium |
| | tantalum | actinium |
| | terbium | polonium |
| | lutetium | |

TABLE 5

Material Composition Alternatives for Liquid Metals Used for Matrix (See FIG. 10)

| Preferred Embodiments | Alternative Embodiments | |
|---|---|---|
| Sn—Al | Zn—Al | Sn |
| Sn—Zn—Al | Pb—Bi—Na | Al |
| Sn—Al—Ga | Pb—Bi—Mg | Li |
| Sn—Al—Ga—Zn | Bi—Al | Pb |

TABLE 5-continued

Material Composition Alternatives for Liquid Metals Used for Matrix (See FIG. 10)

| Preferred Embodiments | Alternative Embodiments | |
|---|---|---|
| Sn—Ga | Pb—Al* | Ba |
| Sn—Pb—Bi | Pb—Bi—Al* | Sr |
| Sn—Pb—Bi—Ga | Bi | Y |
| Sn—Pb | Pb—Ca | Nb |
| Sn—Pb—Ga | Ca | Pt |
| Pb—Na | Ce | Zn |
| Pb—Mg | Rb | Ge |
| Pb—Li | Mg | Ru |
| Na | Zr | Fe |
| Sn | Rn | Mo |
| Pb—Bi | K | Ga |
| Al | NaK | Cr |
| Li | Na | Sn—Li |
| Pb | Mg—Zn | Sn—Al—Mg |
| any combinations of the above | Al—Mg | Any combinations of the above |
| | Sn—Mg—Zn | |

*Pb and Al do not alloy; the liquid Al sits atop the liquid Pb.

TABLE 6

Material Composition Alternatives for Liquid Salts Used for Matrix (See FIG. 10)

| Preferred Embodiments | Alternative Embodiments |
|---|---|
| LiF | FLiBe (LiF + $BeF_2$) |
| $BeF_2$ | FLiNaK (LiF + NaF + KF) |
| NaF | $BaF_2$ |
| KF | $PbF_2$ |
| NaCl | $PbF_4$ |
| $ZrF_4$ | $CeF_3$ |
| any other fluoride salt | $CeF_4$ |
| any other chloride salt | $BiF_3$ |
| any other salt | $BiF_5$ |

Exemplary Method for Manufacturing and Use of the Nuclear Fuel

Figure 11:
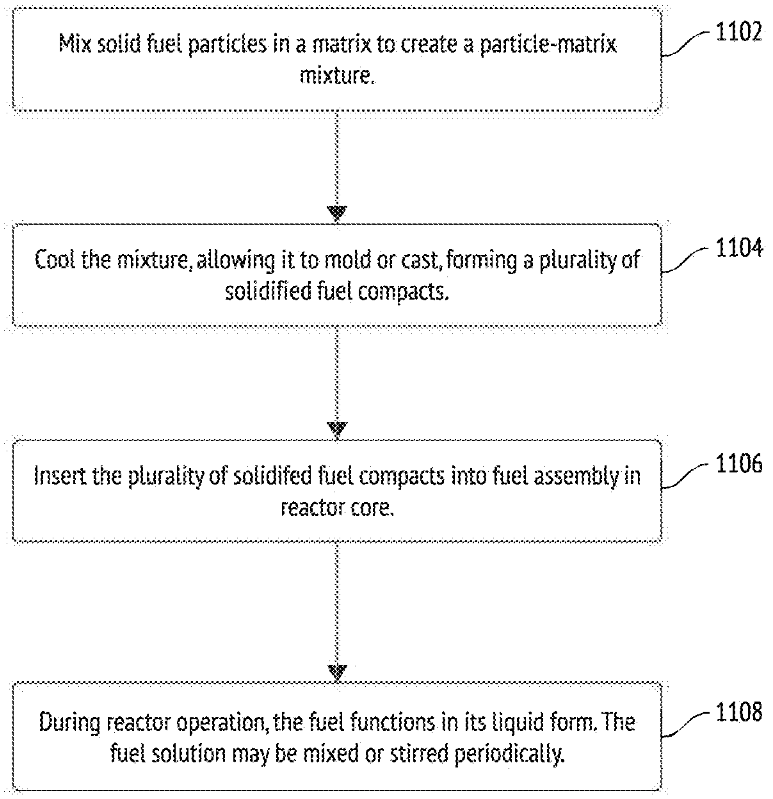
FIG. 11 illustrates a flow diagram of a method for making the nuclear fuel according to embodiments of the invention.

FIG. 11 illustrates a flow diagram of a method for making the nuclear fuel according to an embodiment of the invention. In step 1102, a particle-matrix mixture is created by mixing solid fuel particles, such as TRISO particles, in a matrix, such as a mixture of liquid lead and liquid sodium. The matrix may have a greater, lesser, or equal density as compared to the fuel particles. In step 1104, the process then moves to the cooling and solidification stage, where the mixture is allowed to cool in a mold or cast. As the mixture cools, it may transition from a liquid state to a solid state, forming a plurality of solidified fuel compacts. In step 1106, the plurality of solidified fuel compacts is inserted into the reactor core, preparing the fuel for use in the reactor. In step 1108, during reactor operation, the solidified fuel may be in a liquid state at operating temperature, functioning as liquid fuel within the reactor. The matrix is substantially stagnant with respect to the fuel particles during operation. During operation, the fuel solution may need to be mixed or stirred periodically.

While the method of making nuclear fuel has been described with reference to a specific sequence of steps involving the use of TRISO particles and a liquid metal matrix, it will be understood by those skilled in the art that various changes may be made, and equivalents may be substituted for elements thereof without departing from the scope of the disclosure. For instance, other types of fuel particles could be used, or the cooling and solidification process could be modified.

In addition, many modifications may be made to adapt the method to different types of reactors or fuels, or to optimize the method for specific operating conditions, without departing from the scope of the disclosure. For example, the method could be adapted for use with different types of coolant, or the fuel could be prepared in a different form or shape. Therefore, it is intended that the present disclosure is not limited to the particular method disclosed as the preferred mode contemplated for carrying out this disclosure, but that the disclosure will include all variations and modifications within the spirit and scope of the present disclosure.

Experimental Results

FIG. 12 through FIG. 20 illustrate photographs of exemplary batches of fuel elements comprising solid particles intermixed in a stagnant matrix. The batches use yttria-stabilized zirconia (YSZ) ceramic spheres (diameter of 1 mm) as a surrogate for TRISO nuclear fuel particles. The particles remain well-suspended, despite not being exactly the same density as the immersing metal alloy fluid. When the balls are sufficiently small, the surface area to volume ratio becomes sufficiently high. Furthermore, while buoyancy and gravity forces are proportional to volume, viscosity-related forces are proportional to surface area. Therefore, these particles are small enough so that the viscous forces dominate the buoyancy and gravity forces, such that the particle motion is significantly slowed, when the density of the balls is on the same order of magnitude as the fluid density. While viscous forces will not immobilize the particles permanently, they will slow the particle motion to time scales much longer than most relevant nuclear reactor transients.

As an illustration, suppose that the particles are slightly more dense than the fluid. Initially, they will be at rest, stacked or piled up on the bottom (packing fraction about 64%). When the particles heat up suddenly due to a thermal power spike, the fluid will thermally expand, and, if the fluid is viscous enough, the particles will initially move up with the fluid (reduced packing fraction). This provides very strong negative reactivity feedback for reactor safety. Then, afterward, much more slowly, the particles will gradually settle back down into their original positions. High viscosity is key to ensuring that this resettling time scale is longer than the nuclear transient time scale and initial fluid thermal expansion.

Figure 12:
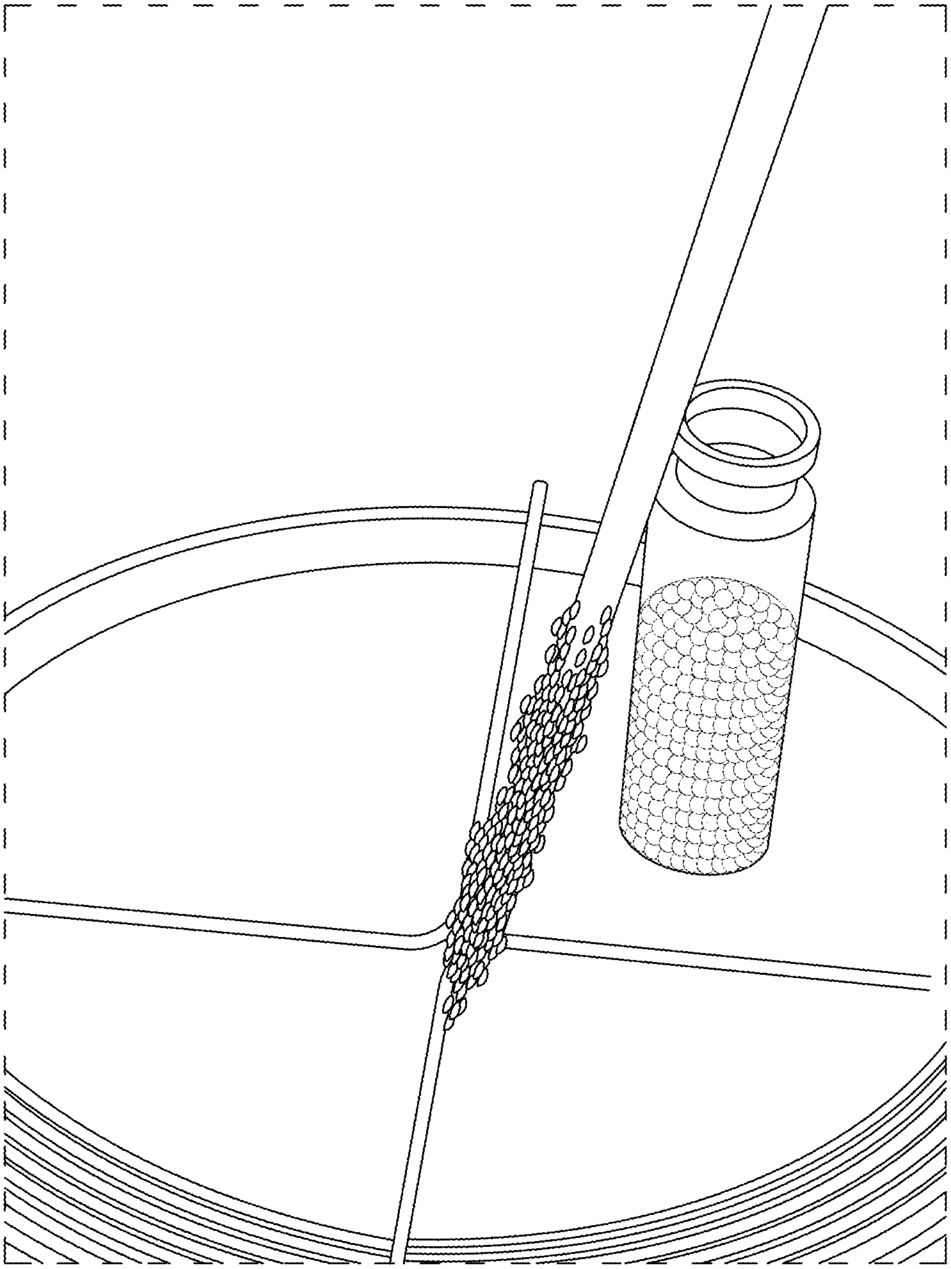
FIG. 12 illustrates a photograph of a batch of fuel particles intermixed in a stagnant matrix in liquid form, according to one embodiment of the present invention.

FIG. 12 illustrates a photograph of a batch of fuel elements in liquid form, according to one embodiment of the present invention. YSZ particles are immersed in a liquid metal matrix. In this exemplary experiment, tin-indium alloy was used as the liquid metal alloy matrix and was chosen for its low melting points, which facilitated an initial testing phase. FIG. 12 captures the earliest experiment conducted to verify whether the YSZ particles would remain suspended and immersed within the liquid metal matrix, and shows that the YSZ particles do remain suspended and immersed within the liquid metal matrix. The tin-indium alloy was chosen primarily as a proof-of-concept, and it is noted that it is unlikely that tin-indium alloy would actually be used in a nuclear reactor due to indium's strong neutron absorption properties. Matrices of various compositions that may be used in reactors are shown in FIG. 13 through FIG. 20. and described above in this disclosure.

Figure 13:
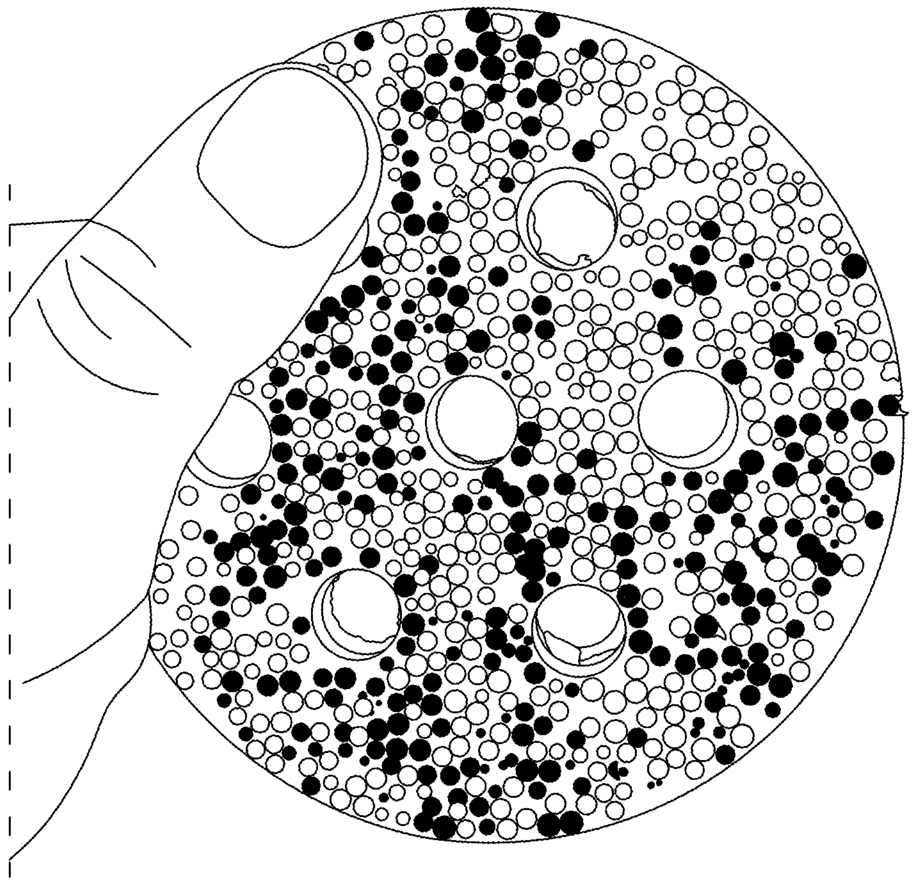
FIG. 13 illustrates a photograph of a cross-section of a batch of fuel elements in solid form, according to one embodiment of the present invention.

FIG. 13 illustrates a photograph of a cross-section of a batch of fuel elements in solid form, according to one embodiment of the present invention. The fuel elements comprise a tin-zinc-aluminum alloy matrix and YSZ ceramic spheres as surrogates for TRISO particles.

Figure 14:
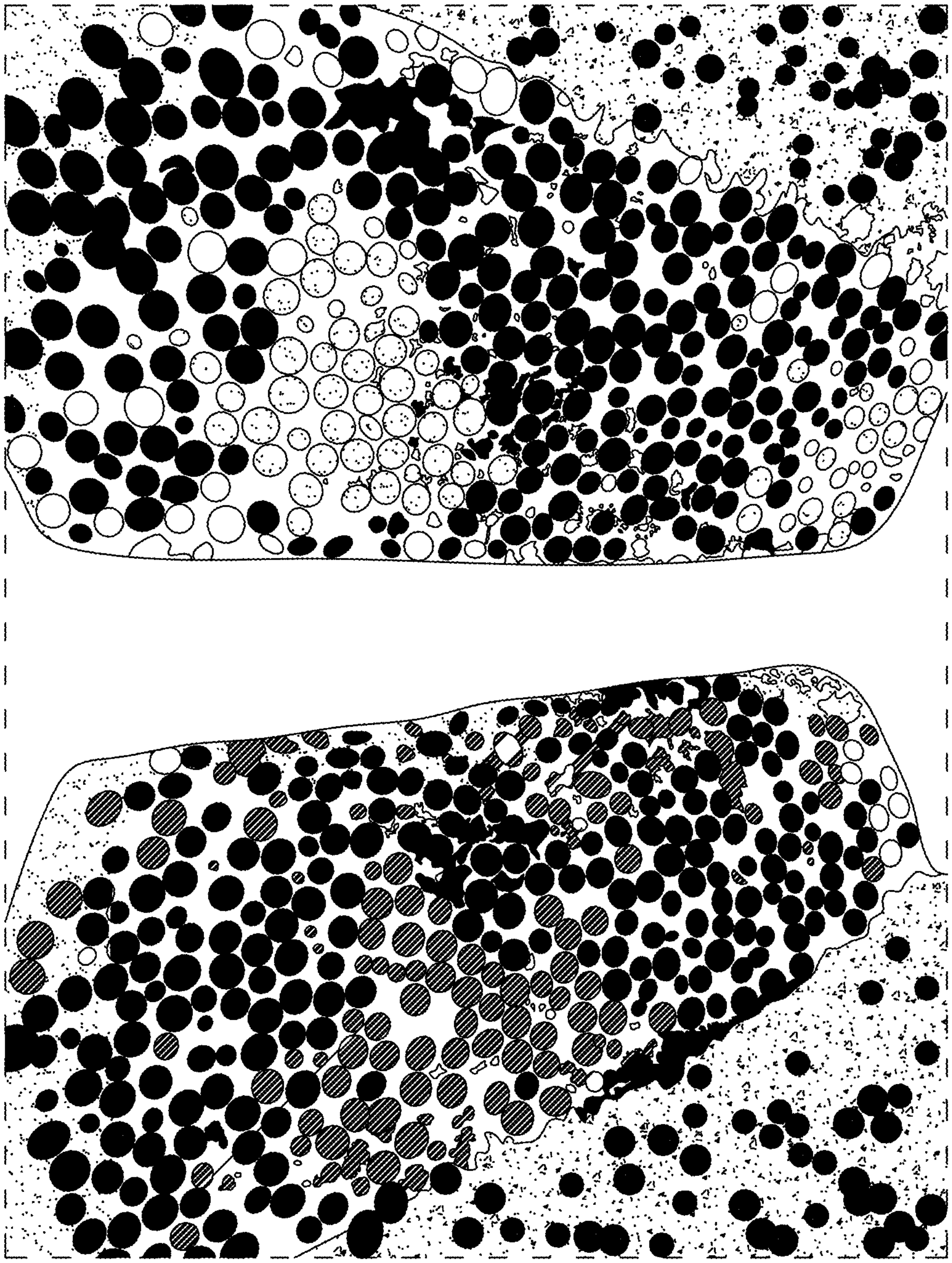
FIG. 14 illustrates a photograph of a cross-section of a batch of fuel elements in solid form, according to one embodiment of the present invention.

FIG. 14 illustrates another photograph of a cross-section of a batch of fuel elements in solid form, according to one embodiment of the present invention. The fuel elements comprise a tin-zinc-aluminum alloy matrix and YSZ ceramic spheres as surrogates for TRISO particles.

Figure 15:
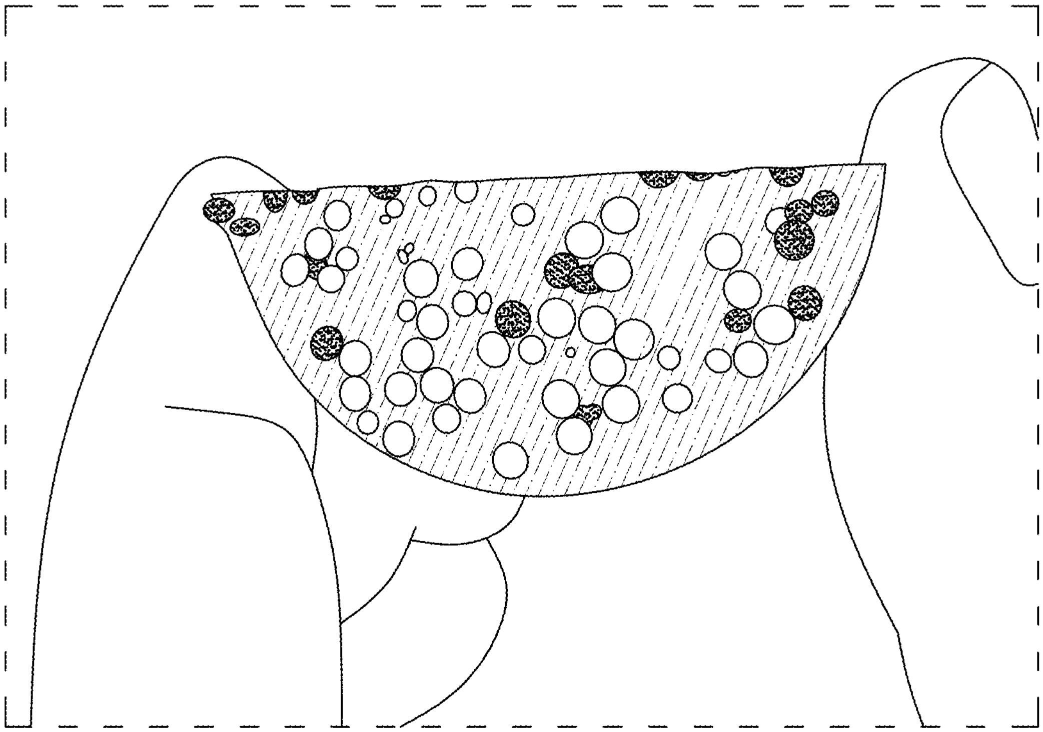
FIG. 15 illustrates another photograph of a cross-section of a batch of fuel elements in solid form, according to one embodiment of the present invention.

FIG. 15 illustrates yet another photograph of a cross-section of a batch of fuel elements in solid form, according to one embodiment of the present invention. The fuel elements comprise a tin-zinc-aluminum alloy matrix and YSZ ceramic spheres as surrogates for TRISO particles.

Figure 16:
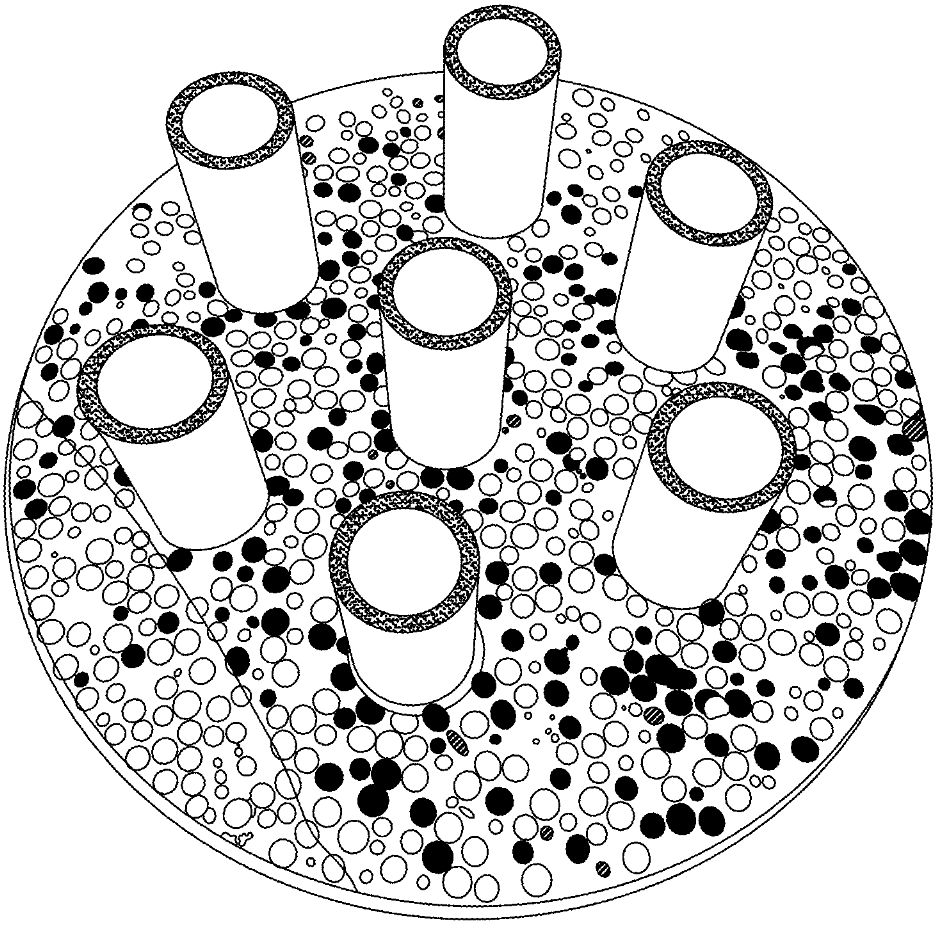
FIG. 16 illustrates yet another photograph of a cross-section of a batch of fuel elements in solid form, according to one embodiment of the present invention.

FIG. 16 illustrates another photograph of a cross-section of a batch of fuel elements in solid form, according to one embodiment of the present invention. The fuel elements comprise a tin-zinc-aluminum alloy matrix and YSZ ceramic spheres as surrogates for TRISO particles.

Figure 17:
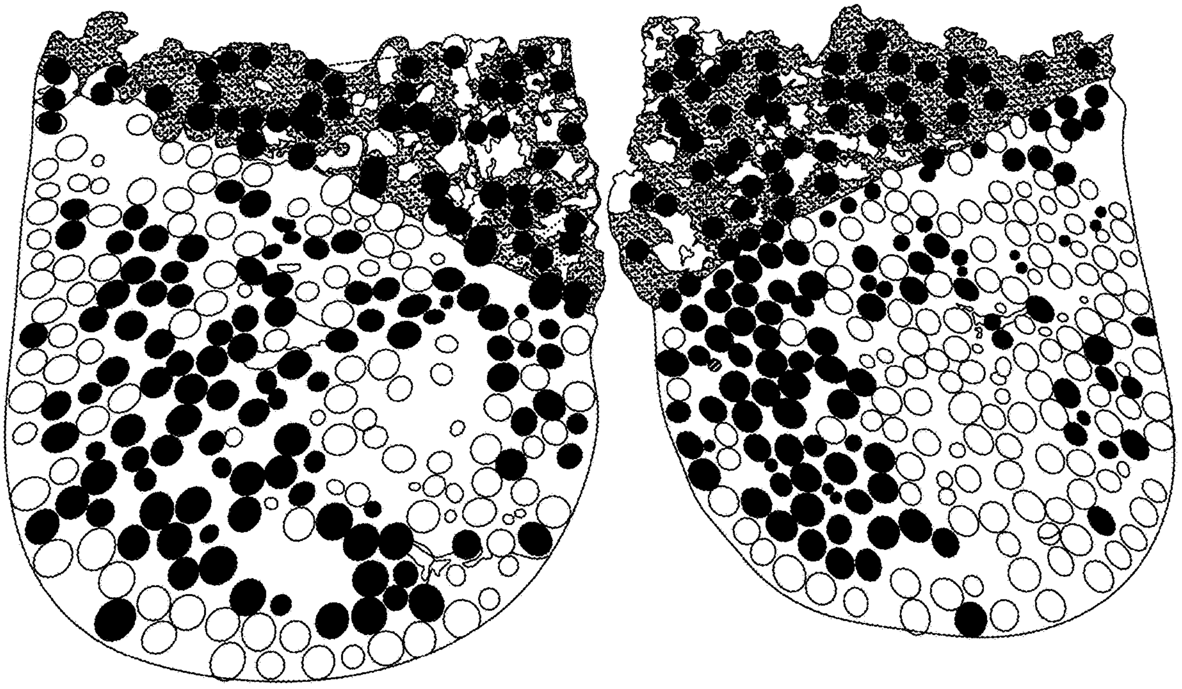
FIG. 17 illustrates yet another photograph of a cross-section of a batch of fuel elements in solid form, according to one embodiment of the present invention.

FIG. 17 illustrates yet another photograph of a cross-section of a batch of fuel elements in solid form, according to one embodiment of the present invention. The fuel elements comprise a tin-zinc-aluminum alloy matrix and YSZ ceramic spheres as surrogates for TRISO particles.

Figure 18:
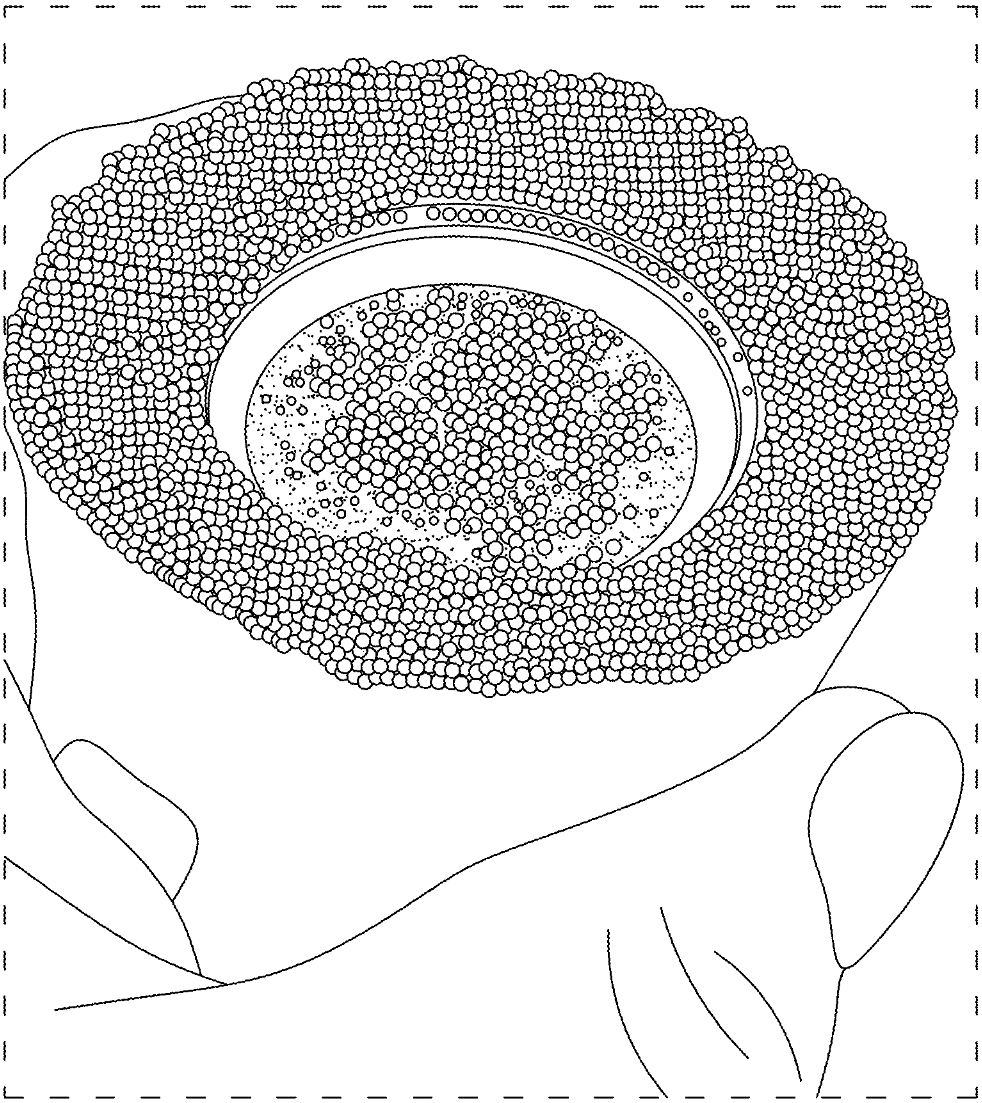
FIG. 18 illustrates yet another photograph of a cross-section of a batch of fuel elements in solid form, according to one embodiment of the present invention.

FIG. 18 illustrates another photograph of a cross-section of a batch of fuel elements in solid form, according to one embodiment of the present invention. The fuel elements comprise a lead-bismuth eutectic alloy matrix and YSZ ceramic spheres as surrogates for TRISO particles.

Figure 19:
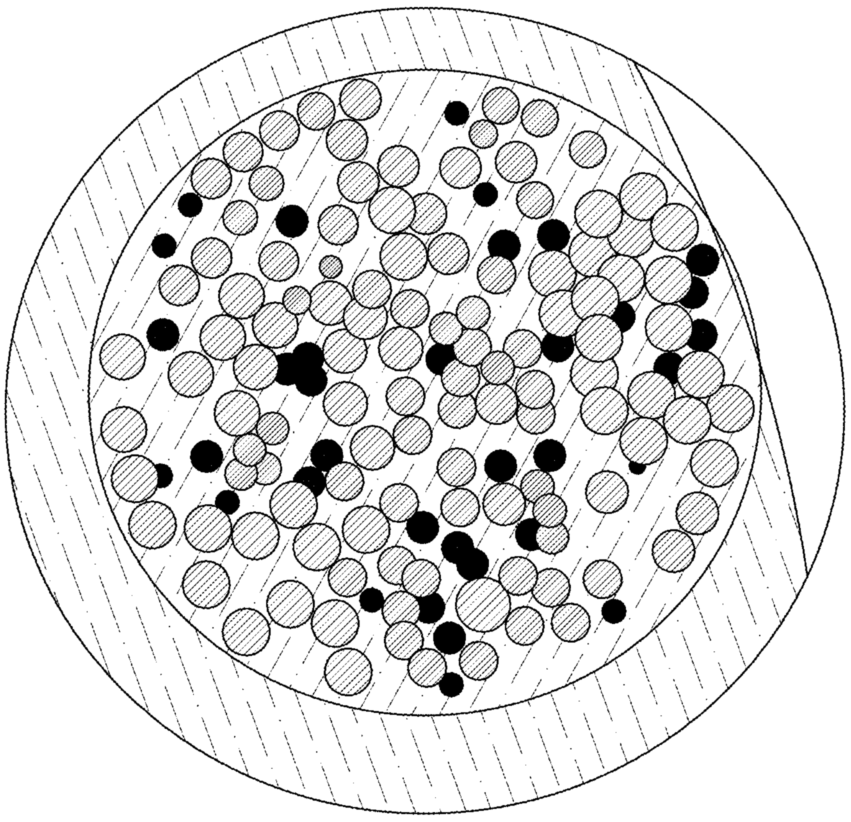
FIG. 19 illustrates yet another photograph of a cross-section of a batch of fuel elements in solid form, according to one embodiment of the present invention.

FIG. 19 illustrates yet another photograph of a cross-section of a batch of fuel elements in solid form, according to one embodiment of the present invention. The fuel elements comprise a lead-magnesium alloy matrix and YSZ ceramic spheres as surrogates for TRISO particles.

Figure 20:
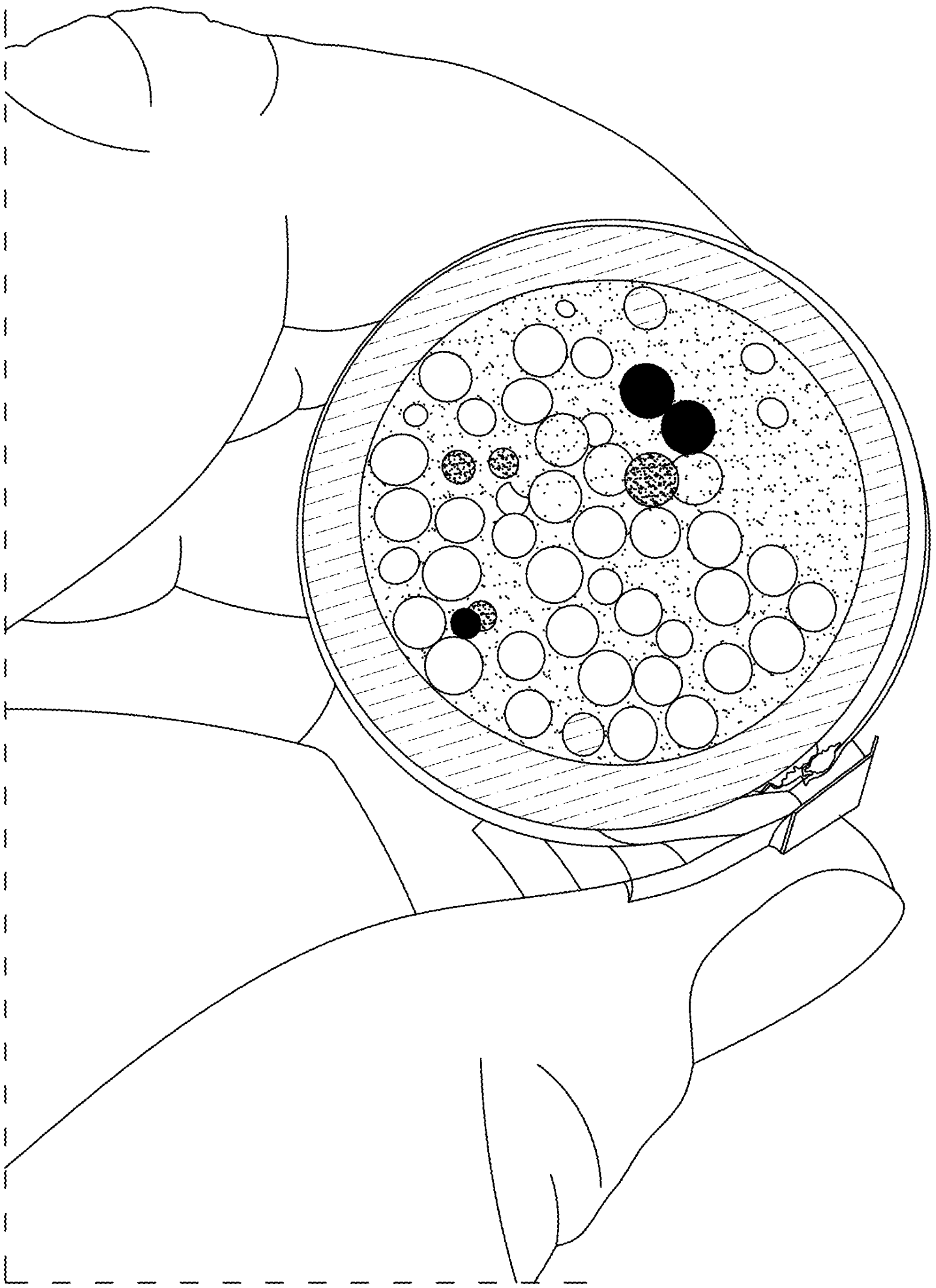
FIG. 20 illustrates yet another photograph of a cross-section of a batch of fuel elements in solid form, according to one embodiment of the present invention.

FIG. 20 illustrates yet another photograph of a cross-section of a batch of fuel elements in solid form, according to one embodiment of the present invention. The fuel elements comprise a lead-sodium alloy matrix and YSZ ceramic spheres as surrogates for TRISO particles.

Model Simulation Results

Simulation results that demonstrate the feasibility of one embodiment of the present invention for use as fuel in a breed-and-burn fission reactor, are shown below. In one embodiment, spherical TRISO particles with a uranium metal fuel kernel (800 μm diameter) are suspended within a liquid mixture of approximately 60% Pb metal and 40% Na metal (volume fractions). The volumetric packing fraction of these spherical particles is 64%, where packing fraction refers to the proportion of the total fluid volume that is occupied by the particles. This fuel is penetrated by numerous coolant pipes, which are SiC tubes filled with flowing liquid Na metal coolant. The entire core is surrounded by a pure liquid Pb neutron reflector. In accordance with one embodiment of the present invention, the basic reactor core parameters, which include the core and neutron reflector dimensions and the fuel particle volumetric packing fraction, are shown in Table 7.

TABLE 7

Exemplary Fuel Core Parameters

| Fuel Core Parameters | Results | Units |
|---|---|---|
| active core height | 400 | cm |
| active core outer diameter | 300 | cm |
| axial reflector thickness | 100 | cm |
| radial reflector thickness | 100 | cm |
| fuel particle volumetric packing fraction | 64% | Volume % |

According to one embodiment, the stagnant matrix surrounding the fuel particles has abundant thermal expansion, causing large negative reactivity feedback to easily counteract the positive reactivity feedback of sodium void worth. Here, sodium void worth refers to the change in reactivity, or the rate of nuclear fission, when the sodium coolant in a reactor is removed or "voided." A positive sodium void worth means that the reactivity increases when the sodium is voided, which may lead to an increase in the reactor's power output and potentially create a dangerous situation. Additionally, reactivity feedback refers to the response of a reactor to changes in conditions such as temperature or power output. Positive reactivity feedback occurs when an increase in power output leads to conditions that further increase the reactivity, creating a self-amplifying cycle. This may potentially lead to a rapid increase in power output, known as a reactor runaway, which may be dangerous. A positive sodium void worth may contribute to positive reactivity feedback, potentially leading to unsafe conditions in a nuclear reactor. The design of the present invention counteracts this effect due to the thermal expansion of the fluid matrix surrounding the fuel particles, leading to a net negative reactivity. The burn-and-breed fast reactor is then able to achieve great fuel utilization at a very large scale with very stable reactivity while still enjoying the high-power density, and great economics of sodium coolant.

TABLE 8

Exemplary Fuel Core Properties

| Exemplary Fuel Core Properties | Results |
|---|---|
| neutron "k-effective" at beginning of life | 1.0085 ± 0.0009 |
| Fissile "conversion ratio" at beginning of life | 1.0072 ± 0.0015 |
| "Delayed neutron fraction" at beginning of life | 0.00797 ± 0.368% |

The neutron k-effective is a dimensionless neutronics parameter that represents the effective neutron multiplication factor of the reactor. If the k-effective is greater than 1.0, the neutron chain reaction reactor achieves criticality, and the reactor may turn on. The results shown in the Table 8 above indicate that the k-effective is 1.0085±0.0009, which exceeds the 1.0 threshold.

The fissile conversion ratio is the ratio of the rate of creation of fissile plutonium-239 (Pu-239) atoms to the rate of destruction of both fissile uranium-235 (U-235) atoms and fissile Pu-239 atoms. The rate of creation of fissile Pu-239 atoms is mostly via neutron absorption of U-238 atoms with subsequent decay. The rate of destruction of both fissile U-235 atoms and fissile Pu-239 atoms is mostly via fission. If the fissile conversion ratio is greater than 1.0, the reactor creates more fissile atoms (fuel for fission) than it consumes. The results shown in the Table 8 above indicate the fissile conversion ratio to be 1.0072±0.0015, which exceeds the 1.0 threshold. This demonstrates the true breed-and-burn physics, i.e., very high fuel utilization, that is enabled by embodiments of the present disclosure.

The delayed neutron fraction is the fraction of all neutrons emitted in the core that did not arise directly from fission. These delayed neutrons arise instead from the decay of various fission products after the fission products emerge from fission. The existence of delayed neutrons on the time scale of fission product decay (seconds to minutes) allows fission reactors to be safely controlled, mainly because the time scale of the fission reaction is extremely short (microseconds to milliseconds). As long as any rapid perturbation in the reactor changes k-effective by a fraction less than the delayed neutron fraction, the reactor is stable, which occurs if and only if its "reactivity coefficients," as defined next, are negative.

The reactor stability with negative reactivity feedback is verified by calculating "reactivity coefficients." The reactivity coefficient is the ratio of the sensitivity of k-effective to changes in the temperature of various core materials. The reactivity coefficients due to thermal expansion of the aggregate fuel (fuel particles+Na-Pb liquid) and the Na—Pb liquid only with no fuel particle movement are calculated. The reactivity coefficients due to thermal expansion of the liquid sodium coolant, the silicon carbide coolant tube, and the liquid lead neutron reflector are also calculated. Simulation results for reactivity coefficients are displayed in Table 9.

The change in k-effective is expressed in terms of dk/kk=1/keff1−1/keff2. It may also be expressed in terms of dollars or cents, where one "dollar" is equal to the "delayed neutron fraction" (which is 0.00797 in this case). For "apples to apples" comparison for the same temperature change, each reactivity coefficient is multiplied by the coefficient of thermal expansion (CTE) (1/K) of each material, to obtain results in units of cents/K.

The Doppler reactivity coefficient in the fuel, which arises from the Doppler effect, caused by varying atom motion at different temperatures, on the microscopic neutron cross-sections of uranium, is also calculated.

TABLE 9

Simulation Results for Reactivity Coefficients

| | dk/kk/% den | Cents/% den | CTE (1/k), volumetric | Cents/K |
|---|---|---|---|---|
| Thermal expansion: | | | | |
| aggregate fuel | $-1.07 \times 10^{-3}$ | −13.4 | N/A | −0.24 |
| only Pb—Na fluid | $-9.85 \times 10^{-6}$ | −0.12 | $1.80 \times 10^{-4}$ | $-2.22 \times 10^{-3}$ |
| SiC coolant tube | $-1.97 \times 10^{-5}$ | −0.25 | $4.00 \times 10^{-6}$ | $-9.89 \times 10^{-5}$ |
| Na coolant | $-1.08 \times 10^{-5}$ | −0.14 | $2.60 \times 10^{-4}$ | $-3.54 \times 10^{-3}$ |
| Pb reflector | $-1.97 \times 10^{-6}$ | $-2.47 \times 10^{-2}$ | $1.20 \times 10^{-4}$ | $-2.97 \times 10^{-4}$ |
| Doppler: | | | | |
| Fuel Doppler effect | N/A | N/A | N/A | $-1.46 \times 10^{-5}$ |

The net reactivity coefficient is strongly negative, mostly due to the aggregate fuel expansion—the Pb—Na fluid pushing the suspended fuel particles apart. The liquid Na coolant thermal expansion reactivity coefficient is slightly negative here. In some embodiments of the invention, the large negative fuel coefficient may dominate and overwhelm any positive coolant coefficient that might arise.

Advantages Over Existing Designs

The present disclosure provides a novel design for a breed-and-burn fission energy reactor that offers several advantages over existing designs. One of the primary advantages is the use of a stagnant matrix surrounding the TRISO particles. As illustrated in the preceding section, this matrix when in liquid form exhibits abundant thermal expansion, which results in a large negative reactivity feedback. This feedback effectively counteracts the positive reactivity feedback associated with sodium, referred to as sodium void worth. As a result, the reactor is able to achieve breed-and-burn equilibrium, characterized by high fuel utilization, at a large scale while maintaining stable reactivity. This contributes to the safety of the reactor operation. Furthermore, the reactor benefits from the high-power density due to the favorable thermal properties of sodium coolant, which enhances its economic viability.

These desirable properties are in contrast with existing breed-and-burn reactor designs, which suffer from the large void worth of its sodium coolant, which leads to a positive reactivity feedback that occurs in the critical neutron chain reaction when the sodium temperature increases for any reason, which reduces its density. Other approaches try to mitigate the sodium void worth problem moderating the neutrons with lead or gas coolant. However, in order to achieve the high neutron energy spectrum needed for the breed-and-burn process, the equilibrium burnup—defined as the fraction of uranium atoms undergoing fission when the reactor's breeding and burning rates eventually balance to achieve equilibrium—may exceed the threshold that any solid uranium-based fuel is able to sustain while maintaining structural and mechanical integrity. This could potentially lead to a problematic disintegration of the solid fuel.

The present design of a hybrid fuel made of fuel particles intermixed in a matrix provides additional benefits through the properties of the solid fuel particles. The use of TRISO fuel particles in some embodiments of the present invention further provides containment of fission products within the fuel particles, preventing undesirable reactions between fission products in the larger fuel core. This is unlike in molten salt reactors (MSRs), which also address the reactivity stability problem with liquid fuel, but which leads to fission products mixing in the fuel core, leading to a "periodic table soup" and posing an elevated risk of radiation release.

In more detail, the TRISO fuel particle contains carbon atoms in its various layers, which weakly moderate neutron energies. While the neutrons are still fast enough to achieve breed-and-burn fuel utilization, the equilibrium burn-up is also very high. The equilibrium burn-up, here, is the fraction of uranium atoms fissioned when the reactor's breeding and burning rates eventually equalize to achieve equilibrium. In some embodiments, the TRISO particles are able to retain structural integrity while withstanding extremely high burn-up levels.

The disclosed invention of TRISO fuel-particles-in-matrix fuel allows for a much lower radiation leakage risk than is presently known in the art. The TRISO fuel particles 310 intermixed in the stagnant matrix are structurally more resistant to neutron irradiation, corrosion, oxidation, and high temperatures. Furthermore, when a uranium atom undergoes fission, it splits into two smaller atoms, called fission products or fission fragments, which are typically radioactive and may range in size and atomic number and are produced with different probabilities. Most of these fission products are radioactive and decay into other fission fragments. Each TRISO fuel particle acts as its own containment system, retaining fission products under all reactor conditions, and preventing fission products from undesirably reacting in the larger fuel core.

The use of TRISO particles in the present design thus allows for a much lower radiation release risk compared to reactors using non-TRISO solid fuel. This eliminates the need for extensive, years-long chemistry research testing, further enhancing the practicality and feasibility of the present design. A summary of the advantages and benefits of the fuel design of the present invention is given in Table 10. One embodiment of the present invention is presented in the final column of Table 10, and as demonstrated, has good performance in all criteria considered, including fuel utilization, power density (and economic favorability), radiation and coolant leak risk, safety, and stability with respect to coolant void worth, and technical risk due to new nuclear materials or unknown chemistry of reaction byproducts. Overall, the fuel design of the present invention allows for high fuel utilization with safe, stable reactivity, and a very low radiation release risk.

TABLE 10

Comparison & Advantages of the Disclosed Embodiments Over Other Designs

| | Prior Art Designs | | | | | Example Embodiment of the Invention |
|---|---|---|---|---|---|---|
| Fast reactor type | Traditional | Traditional | Breed-and-burn | Breed-and-burn | Breed-and-burn | Breed-and-burn |
| Coolant | sodium | lead or gas | sodium | lead or gas | molten salt | sodium |
| Fuel phase | solid | solid | solid | solid | liquid | solid particles in matrix |
| Breed-and-burn achievable? (good fuel utilization + less waste) | no | no | yes | yes | yes | yes |
| Economic favorability (power density) | high | low | very high | low | very high | very high |
| Radiation/ coolant leak risk | low | low | low | low | very high | low |
| Safety and coolant void worth stability | moderate | very good | bad (safety risk) | good | very good | very good |
| Technical risk (new nuclear materials) | low/none | low/none | high | high | moderate/ low | low/none |
| Technical risk (unknown chemistry of fission products) | low/none | low/none | low | low | high | low/none |
| Already exists? (at least one power plant) | yes | yes | no | no | no | no |

Additional Exemplary Applications and Embodiments

In some aspects, embodiments of the disclosed nuclear fuel may be used to create energy in a fast spectrum fission reactor, a thermal spectrum fission reactor, an epithermal spectrum fission reactor, or a fission-fusion hybrid reactor. In other aspects, embodiments of the disclosed nuclear fuel may be used to create energy in a nuclear reactor cooled by liquid metal coolant, liquid salt coolant, gas coolant, water coolant, or heat pipes.

The present invention may also be advantageous for the fusion energy industry, in both future fusion reactors as well as fission-fusion hybrid reactors. In fusion reactors, the design may or may not include the same cooling tubes. The TRISO particles may be immersed within a lead-lithium fluid mixture. Lithium allows neutrons to breed tritium, which the first fusion reactors must create in order to replenish their deuterium-tritium fuel. For the fission-fusion hybrid technology, the TRISO fuel for the fission component is very much desirable for no fission product leakage. The breed-and-burn and very stable reactivity features of the fuel design would also be very attractive for use of fission fuel more efficiently by breeding plutonium. The present disclosure's combination of fission product containment within TRISOs and matrix that may be mixed (effectively shuffled) without removal from the reactor makes it an attractive choice for fission-based augmentation of fusion energy. The various embodiments of the invention may be used, or modified for use, in any other types of nuclear systems, including but not limited to fission reactors, fusion reactors, fission-fusion hybrid reactors, radioisotope energy systems, and accelerator systems.

Other embodiments of the invention will be apparent to those skilled in the art from consideration of the specification and practice of the invention disclosed herein. It is intended that the specification and examples be considered as exemplary only, and various other embodiments and alternative methods of implementation are within the scope of the present invention.

What is claimed is:

1. A nuclear fuel element, comprising:

a plurality of solid nuclear fuel particles, wherein each of the plurality of solid nuclear fuel particles comprises a nuclear material, and wherein the plurality of solid nuclear fuel particles comprises one or more of tristructural-isotropic (TRISO) particles, bistructural-isotropic (BISO) particles, quadristructural-isotropic (QUADRISO) particles; and a non-solid matrix, wherein the plurality of solid nuclear fuel particles is intermixed in the non-solid matrix, wherein the non-solid matrix is substantially stagnant relative to the plurality of solid nuclear fuel particles, and wherein the non-solid matrix comprises a material selected from the group consisting of a liquid metal, a liquid metal alloy, and a liquid salt.

2. The nuclear fuel element of claim 1, wherein the non-solid matrix is selected from the group consisting of a liquid metal and a liquid metal alloy.

3. The nuclear fuel element of claim 1, wherein the non-solid matrix is selected from the group consisting of tin, lead, sodium, aluminum, bismuth, zinc, magnesium, calcium, cerium, rubidium, zirconium, beryllium, potassium, yttrium, strontium, barium, and alloys thereof.

4. The nuclear fuel element of claim 1, wherein the non-solid matrix further comprises an element selected from the group consisting of silicon and germanium.

5. The nuclear fuel element of claim 1, wherein the non-solid matrix is selected from the group consisting of tin, tin-aluminum alloy, tin-aluminum-gallium alloy, tin-zinc-aluminum alloy, tin-magnesium alloy, tin-aluminum-magnesium alloy, and tin-magnesium-zinc alloy.

6. The nuclear fuel element of claim 5, wherein a composition percent of tin in the non-solid matrix is more than 80 percent tin by mass fraction.

7. The nuclear fuel element of claim 1, wherein the non-solid matrix is selected from the group consisting of lead, lead-bismuth-tin alloy, and lead-magnesium alloy.

8. The nuclear fuel element of claim 1, wherein the non-solid matrix is selected from the group consisting of sodium-lead alloy, sodium-lead-bismuth alloy, and sodium-bismuth alloy.

9. The nuclear fuel element of claim 1, wherein the non-solid matrix is selected from the group consisting of lead-bismuth alloy and lead-bismuth eutectic.

10. The nuclear fuel element of claim 1, wherein the non-solid matrix is liquid sodium.

11. The nuclear fuel element of claim 1, wherein the non-solid matrix is liquid gallium.

12. The nuclear fuel element of claim 1, wherein the non-solid matrix comprises an alloy selected from the group consisting of:

an alloy of tin, aluminum, and gallium;

an alloy of tin, aluminum, lead, and bismuth;

an alloy of lead and magnesium;

an alloy of aluminum and magnesium;

an alloy of magnesium and zinc;

an alloy of bismuth and sodium; and an alloy of lead and sodium.

13. The nuclear fuel element of claim 1, wherein the non-solid matrix comprises an alloy selected from the group consisting of an alloy of lead and lithium; an alloy of tin and lithium; and an alloy of lead, bismuth, and lithium.

14. The nuclear fuel element of claim 1, wherein the non-solid matrix comprises liquid salt.

15. The nuclear fuel element of claim 1, wherein the non-solid matrix further comprises a material selected from the group consisting of water, sulfur, a supercritical fluid, organic liquid, and inorganic liquid.

16. The nuclear fuel element of claim 1, wherein the plurality of solid nuclear fuel particles comprises tristructural-isotropic (TRISO) particles, and wherein the non-solid matrix is selected from the group consisting of tin-aluminum alloy, tin-aluminum-gallium alloy, lead-bismuth alloy, and lead.

17. The nuclear fuel element of claim 1, wherein at least one of the plurality of solid nuclear fuel particles comprises one or more materials selected from the group consisting of a ceramic material, a metallic material, a carbon material, and a cermet material.

18. The nuclear fuel element of claim 1, wherein at least one of the plurality of solid nuclear fuel particles comprises actinide fuel kernels.

19. The nuclear fuel element of claim 1, wherein at least one of the plurality of solid nuclear fuel particles comprises a fuel kernel selected from the group consisting of a UN kernel, a UO2 kernel, a UC kernel, and a UCO kernel.

20. The nuclear fuel element of claim 1, wherein the nuclear material is selected from the group consisting of a fissionable material, a transmutation material, and a fertile material.

21. The nuclear fuel element of claim 1, wherein the plurality of solid nuclear fuel particles comprises fissionable material selected from the group consisting of uranium, thorium, and plutonium.

22. The nuclear fuel element of claim 1, wherein the plurality of solid nuclear fuel particles comprises transmutation or fertile materials selected from the group consisting of thulium, thallium, gadolinium, silver, strontium, holmium, and lithium.

23. The nuclear fuel element of claim 1, wherein each of the plurality of solid nuclear fuel particles has a volume smaller than 0.5 cm3 and larger than 6×10-7 cm3.

24. The nuclear fuel element of claim 1, wherein each of the plurality of solid nuclear fuel particles has a volume smaller than 1.5×10−2 cm3 and larger than 6×10−7 cm3.

25. A nuclear reactor, comprising:

a power generation loop; and a reactor, wherein the reactor comprises a nuclear fuel element and a coolant, wherein the nuclear fuel element comprises:

a plurality of solid nuclear fuel particles, wherein each of the plurality of solid nuclear fuel particles comprises a nuclear material, and wherein the plurality of solid nuclear fuel particles comprises one or more of tristructural-isotropic (TRISO) particles, bistructural-isotropic (BISO) particles, quadristructural-isotropic (QUADRISO) particles, or any other composite particle that is a spherical, layered fuel particle comprising carbon, ceramic, and any actinide; and a non-solid matrix, wherein the plurality of solid nuclear fuel particles is intermixed in the non-solid matrix, wherein the non-solid matrix is substantially stagnant relative to the plurality of solid nuclear fuel particles, and wherein the non-solid matrix comprises a material selected from the group consisting of a liquid metal, a liquid metal alloy, and a liquid salt.

* * * * *